(12) United States Patent
Koike

(10) Patent No.: US 9,784,898 B2
(45) Date of Patent: Oct. 10, 2017

(54) PHASE DIFFERENCE COMPENSATING ELEMENT AND PROJECTION-TYPE IMAGE PROJECTING DEVICE

(71) Applicant: DEXERIALS CORPORATION, Tokyo (JP)

(72) Inventor: Nobuyuki Koike, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/784,137

(22) PCT Filed: Apr. 9, 2014

(86) PCT No.: PCT/JP2014/060330
§ 371 (c)(1),
(2) Date: Oct. 13, 2015

(87) PCT Pub. No.: WO2014/168185
PCT Pub. Date: Oct. 16, 2014

(65) Prior Publication Data
US 2016/0054500 A1 Feb. 25, 2016

(30) Foreign Application Priority Data

Apr. 10, 2013 (JP) ................................. 2013-081775
Apr. 9, 2014 (JP) ................................. 2014-080245

(51) Int. Cl.
*G02B 1/11* (2015.01)
*G02B 5/30* (2006.01)
(Continued)

(52) U.S. Cl.
CPC .............. *G02B 5/3083* (2013.01); *G02B 1/11* (2013.01); *G02B 1/115* (2013.01);
(Continued)

(58) Field of Classification Search
CPC ........... G02B 1/11; G02B 1/111; G02B 1/113; G02B 1/115; G02B 1/116; G02B 1/118; G02B 5/08; G02B 5/285
See application file for complete search history.

(56) References Cited

U.S. PATENT DOCUMENTS

2012/0293732 A1   11/2012   Koike et al.
2013/0135727 A1   5/2013    Takada et al.
(Continued)

FOREIGN PATENT DOCUMENTS

JP      2004-157349 A    6/2004
JP      2005-172984 A    6/2005
(Continued)

OTHER PUBLICATIONS

Jul. 8, 2014 International Search Report issued in International Patent Application No. PCT/JP2014/060330.

*Primary Examiner* — Sultan Chowdhury
(74) *Attorney, Agent, or Firm* — Oliff PLC

(57) ABSTRACT

A phase difference compensating element that can effectively compensate polarization disturbance, and a projection-type image projecting device are provided. The phase difference compensating element includes: a birefringent layer formed with a film stack of obliquely-deposited films, each of the obliquely-deposited films having a thickness equal to or smaller than the used wavelength; and an Rd-AR film that is formed with a film stack of two or more kinds of dielectric films having different refractive indexes, and provides an arbitrary phase difference to a phase difference in obliquely-incident transmitted light in the birefringent layer. The phase difference Rd to be provided by the Rd-AR film satisfies $1<Rd(\lambda)/Rd(\lambda')<1.5$ ($\lambda<\lambda'$), at an arbitrary wavelength $\lambda$ in the used wavelength band and within an incident light angle range of 0 to 25 degrees.

12 Claims, 20 Drawing Sheets

(51) Int. Cl.
  *G02F 1/13363* (2006.01)
  *G02F 1/1335* (2006.01)
  *H04N 9/31* (2006.01)
  *G02B 1/115* (2015.01)
  *G03B 21/20* (2006.01)

(52) U.S. Cl.
  CPC .... *G02F 1/13363* (2013.01); *G02F 1/133502* (2013.01); *G03B 21/2073* (2013.01); *H04N 9/3167* (2013.01); *G02F 2001/133635* (2013.01); *G02F 2001/133638* (2013.01)

(56) References Cited

U.S. PATENT DOCUMENTS

| | | | |
|---|---|---|---|
| 2013/0177717 A1 | 7/2013 | Koike et al. | |
| 2013/0260096 A1* | 10/2013 | Shiki | C23C 18/1295 428/142 |
| 2013/0271843 A1* | 10/2013 | Bruynooghe | G02B 1/11 359/601 |

FOREIGN PATENT DOCUMENTS

| | | |
|---|---|---|
| JP | 2006-171327 A | 6/2006 |
| JP | 2007-101764 A | 4/2007 |
| JP | 2010-272595 A | 12/2010 |
| JP | 2012-189773 A | 10/2012 |
| JP | 2012-242449 A | 12/2012 |
| WO | 2009/001799 A1 | 12/2008 |
| WO | 2011/148465 A1 | 12/2011 |
| WO | 2011/162331 A1 | 12/2011 |

* cited by examiner

| layer | dielectric | thickness (nm) |
|---|---|---|
| 1 | a | 15 |
| 2 | b | 36.49 |
| 3 | a | 42 |
| 4 | b | 37.29 |
| 5 | a | 25.81 |
| 6 | b | 46.7 |
| 7 | a | 25.6 |
| 8 | b | 32.85 |
| 9 | a | 23.81 |
| 10 | b | 42.11 |
| 11 | a | 25.66 |
| 12 | b | 36.9 |
| 13 | a | 24.98 |
| 14 | b | 38.9 |
| 15 | a | 23.7 |
| 16 | b | 39.16 |
| 17 | a | 25.29 |
| 18 | b | 39.28 |
| 19 | a | 22.2 |
| 20 | b | 39.31 |
| 21 | a | 26.08 |
| 22 | b | 40.65 |
| 23 | a | 22.65 |
| 24 | b | 40.25 |
| 25 | a | 23.97 |
| 26 | b | 38.48 |
| 27 | a | 24.26 |
| 28 | b | 44.02 |
| 29 | a | 23.37 |
| 30 | b | 32.72 |
| 31 | a | 24.65 |
| 32 | b | 47.5 |
| 33 | a | 26.4 |
| 34 | b | 33.07 |
| 35 | a | 39.72 |
| 36 | b | 85.37 |

FIG.17

| layer | dielectric | thickness (nm) |
|---|---|---|
| 1 | a | 15 |
| 2 | b | 51.36 |
| 3 | a | 42.1 |
| 4 | b | 38.43 |
| 5 | a | 31.24 |
| 6 | b | 46.49 |
| 7 | a | 25.75 |
| 8 | b | 42.12 |
| 9 | a | 30.82 |
| 10 | b | 43.69 |
| 11 | a | 26.48 |
| 12 | b | 45.15 |
| 13 | a | 29.6 |
| 14 | b | 42.78 |
| 15 | a | 27.12 |
| 16 | b | 46.94 |
| 17 | a | 27.73 |
| 18 | b | 44.03 |
| 19 | a | 28.23 |
| 20 | b | 46.44 |
| 21 | a | 26.26 |
| 22 | b | 46.16 |
| 23 | a | 29.44 |
| 24 | b | 43.11 |
| 25 | a | 26.21 |
| 26 | b | 48.63 |
| 27 | a | 30.71 |
| 28 | b | 39.65 |
| 29 | a | 26.48 |
| 30 | b | 50.02 |
| 31 | a | 30.78 |
| 32 | b | 37.41 |
| 33 | a | 48.81 |
| 34 | b | 102.96 |

FIG.25

| layer | dielectric | thickness (nm) |
|---|---|---|
| 1 | a | 15 |
| 2 | b | 61.96 |
| 3 | a | 39.26 |
| 4 | b | 45.1 |
| 5 | a | 33.76 |
| 6 | b | 42.33 |
| 7 | a | 28.86 |
| 8 | b | 44 |
| 9 | a | 33.08 |
| 10 | b | 49.59 |
| 11 | a | 29.89 |
| 12 | b | 50.66 |
| 13 | a | 32.69 |
| 14 | b | 50.22 |
| 15 | a | 29.83 |
| 16 | b | 53.29 |
| 17 | a | 30.8 |
| 18 | b | 50.95 |
| 19 | a | 31.03 |
| 20 | b | 51.03 |
| 21 | a | 29.84 |
| 22 | b | 49.78 |
| 23 | a | 33.36 |
| 24 | b | 47.95 |
| 25 | a | 29.5 |
| 26 | b | 50.68 |
| 27 | a | 34.89 |
| 28 | b | 43.4 |
| 29 | a | 30.72 |
| 30 | b | 53.43 |
| 31 | a | 38.59 |
| 32 | b | 35.89 |
| 33 | a | 63.68 |
| 34 | b | 114.48 |

FIG.26

| layer | dielectric | thickness (nm) |
|---|---|---|
| 1 | b | 128.73 |
| 2 | a | 11.82 |
| 3 | b | 63.61 |
| 4 | a | 30.28 |
| 5 | b | 58.49 |
| 6 | a | 33.46 |
| 7 | b | 59.01 |
| 8 | a | 39.96 |
| 9 | b | 60.48 |
| 10 | a | 32.27 |
| 11 | b | 66.24 |
| 12 | a | 41.9 |
| 13 | b | 57.41 |
| 14 | a | 31.96 |
| 15 | b | 70.58 |
| 16 | a | 44.16 |
| 17 | b | 50.69 |
| 18 | a | 31.2 |
| 19 | b | 80.89 |
| 20 | a | 43.79 |
| 21 | b | 33.87 |
| 22 | a | 38.59 |
| 23 | b | 103.95 |
| 24 | a | 22.24 |
| 25 | b | 32.54 |
| 26 | a | 63.95 |
| 27 | b | 93.77 |

FIG.27

| layer | dielectric | thickness (nm) |
|---|---|---|
| 1 | b | 18.44 |
| 2 | a | 30.45 |
| 3 | b | 49.27 |
| 4 | a | 57.61 |
| 5 | b | 19.59 |
| 6 | a | 56.57 |
| 7 | b | 43.11 |
| 8 | a | 59.24 |
| 9 | b | 27.83 |
| 10 | a | 48.2 |
| 11 | b | 39.06 |
| 12 | a | 65.6 |
| 13 | b | 34.23 |
| 14 | a | 45.95 |
| 15 | b | 32.18 |
| 16 | a | 65.11 |
| 17 | b | 38.62 |
| 18 | a | 52.76 |
| 19 | b | 27.69 |
| 20 | a | 54.26 |
| 21 | b | 39.8 |
| 22 | a | 64.64 |
| 23 | b | 21.92 |
| 24 | a | 40.28 |
| 25 | b | 49.14 |
| 26 | a | 82.55 |

FIG.28

PHASE DIFFERENCE COMPENSATING ELEMENT AND PROJECTION-TYPE IMAGE PROJECTING DEVICE

BACKGROUND OF THE INVENTION

Field of the Invention

The present invention relates to a phase difference compensating element that is formed with an inorganic material and has a high heat resistance. More particularly, the present invention relates to a phase difference compensating element and a projection-type image projecting device that utilize an in-plane phase difference with a birefringent layer, and a phase difference in obliquely-incident light with a dielectric multi-layer film, with respect to light in a used wavelength band. This application claims benefit of priority to Japanese Patent Application No. 2013-81775, filed on Apr. 10, 2013, and Japanese Patent Application No. 2014-80245, filed on Apr. 9, 2014, the entire contents of which are incorporated by reference herein.

Description of Related Art

Conventionally, a phase difference compensating element is formed with an inorganic optical single crystal such as crystallized quartz, or a stretched polymer film. Inorganic optical single crystal as a phase difference compensating element has excellent durability and reliability, but is costly in raw materials and processing. Inorganic optical single crystal also has a problem of relatively high angle dependence with respect to incident light. Meanwhile, a stretched polymer film is the most widely-used phase difference compensating element, but easily deteriorates with heat and UV rays. Therefore, a stretched polymer film has a problem in durability.

Also, an obliquely-deposited film having an oblique columnar structure (an obliquely-deposited phase difference element) is known as a phase difference compensating element. In this obliquely-deposited film, an arbitrary phase difference can be set by adjusting the thickness, in principle, and a larger area can be easily obtained. Also, lower costs can be realized through mass production. As an inorganic material is used, a phase difference compensating element with a high light resistance and a high heat resistance can be provided.

Also, so as to improve contrast characteristics and viewing angle characteristics, optical compensation techniques using phase difference compensating elements are being used in projection-type image projecting devices these days. An example of an optical compensation technique using a phase difference compensating element is black luminance correction in vertically-oriented liquid crystal shown in FIG. 29.

In vertically-oriented liquid crystal 100, liquid crystal molecules are vertically-oriented in a no-voltage applied state (black state). When light flux vertically enters a reflective light modulating element 110 including this vertically-oriented liquid crystal 100, any birefringence is not generated. Therefore, light flux that has entered a reflective polarizer 120 and been turned into predetermined linearly-polarized light again enters and passes through the reflective polarizer, without any polarization disturbance. Thus, no light leaks into the screen.

However, with respect to light that has entered the reflective light modulating element 110 with a predetermined angle, a birefringence is generated. Therefore, light flux that has entered the reflective light modulating element 110 is transformed from linearly-polarized light to elliptically-polarized light. As a result, part of the light that has reentered the reflective polarizer 120 reaches the screen, resulting in poorer contrast.

Meanwhile, so as to restrain orientation disturbance among liquid crystal molecules due to a transverse electric field, and to improve the response speed of liquid crystal molecules, there is a suggested technique by which liquid crystal molecules are tilted at a predetermined angle (pretilt angle) with respect to the plane of the reflective light modulating element. In this case, however, the polarization state of light flux that has vertically entered the reflective light modulating element is also disturbed by a birefringence, resulting in poorer contrast.

Various techniques have been suggested as methods for compensating the above described polarization disturbance and realizing an optimum polarization state. Examples of such suggested methods include a method of conducting phase difference compensation by providing a phase difference compensating element such as the above described crystallized quartz in a position parallel to the surface of a reflective light modulating element (see Patent Literature 1, for example), and a method of conducting phase difference compensation by providing an organic material having a birefringence, such as a polymer film, in a position parallel to the surface of a reflective light modulating element (see Patent Literatures 2 and 3, for example).

However, in a case where a method of processing single crystal serving as an optical compensation element is employed, particularly when compensation is to be conducted by taking into account even the pretilt angle of liquid crystals, cutting needs to be performed at a predetermined angle with respect to the crystal axis, and extremely high accuracy is required in material cutting and polishing, leading to high costs.

Also, where compensation is to be conducted with a polymer-type stretched film taking into account even the pretilt angle of liquid crystal molecules, there is the need to prepare a biaxial phase difference film or a combination of phase difference films. By this method, manufacturing is relatively easy, but deterioration due to heat or UV rays easily occurs as described above. Therefore, there is a problem in durability.

Meanwhile, Patent Literature 4 discloses a phase difference compensating element using formation of thin films of dielectric materials. This phase difference compensating element includes a negative C-plate formed with alternately-stacked high and low refractive index materials, and an O-plate formed with two or more obliquely-deposited films. This phase difference compensating element corrects polarization disturbance in light obliquely-incident on the reflective light modulating element with the use of the negative C-plate having a structural birefringence generated by the alternately-stacked high and low refractive index materials, and corrects polarization disturbance caused by the pretilt angle with the use of the O-plate formed with two or more obliquely-deposited films.

However, in the formation of the O-plate through oblique deposition, the deposition angle needs to be set within a certain range so as to generate a birefringence, and the column growth angle is restricted within a predetermined width. Oblique particles grown in this manner are not necessarily suitable for correcting polarization disturbance caused by the pretilt angle. There is also a disclosure that a total of 80 stacked layers are necessary in manufacturing the negative C-plate, and therefore, higher costs and a longer lead time are feared.

Patent Literature 1: JP 2005-172984 A
Patent Literature 2: JP 2007-101764 A
Patent Literature 3: WO 2009/001799 A
Patent Literature 4: JP 2006-171327 A

BRIEF SUMMARY OF THE INVENTION

The present invention has been suggested in view of the above circumstances, and aims to provide a phase difference compensating element that can effectively compensate polarization disturbance and a projection-type image projecting device.

To solve the above problems, a phase difference compensating element according to the present invention includes: a birefringent layer in which obliquely-deposited films having a thickness equal to or smaller than the used wavelength are stacked; and a phase-difference-adding antireflection layer that is formed with two or more kinds of dielectric films having different refractive indexes, and provides an arbitrary phase difference, in addition to a phase difference in obliquely-incident transmitted light in the birefringent layer.

A projection-type image projecting device according to the present invention includes a phase difference compensating element provided between a reflective polarizer and a reflective light modulating element, the phase difference compensating element including: a birefringent layer formed with a film stack of obliquely-deposited films each having a thickness equal to or smaller than the used wavelength; and a phase-difference-adding antireflection layer that is formed with a film stack of two or more kinds of dielectric films having different refractive indexes, and provides an arbitrary phase difference, in addition to a phase difference in obliquely-incident transmitted light in the birefringent layer.

According to the present invention, an in-plane phase difference R0 is controlled in a birefringent layer, and a phase difference Rd in obliquely-incident transmitted light is controlled while reflection is prevented in a phase-difference-adding antireflection layer. Accordingly, polarization disturbance can be effectively compensated.

BRIEF DESCRIPTION OF THE SEVERAL VIEWS OF THE DRAWINGS

FIG. 17 is a table showing the thicknesses of the respective films in an Rd-AR film of Example 1.

FIG. 25 is a table showing the thicknesses of the respective films in an Rd-AR film of Example 2.

FIG. 26 is a table showing the thicknesses of the respective films in an Rd-AR film of Example 3.

FIG. 27 is a table showing the thicknesses of the respective films in an Rd-AR film of Example 4.

FIG. 28 is a table showing the thicknesses of the respective films in an Rd-AR film of Comparative Example 1.

DETAILED DESCRIPTION OF THE INVENTION

Figure 1:
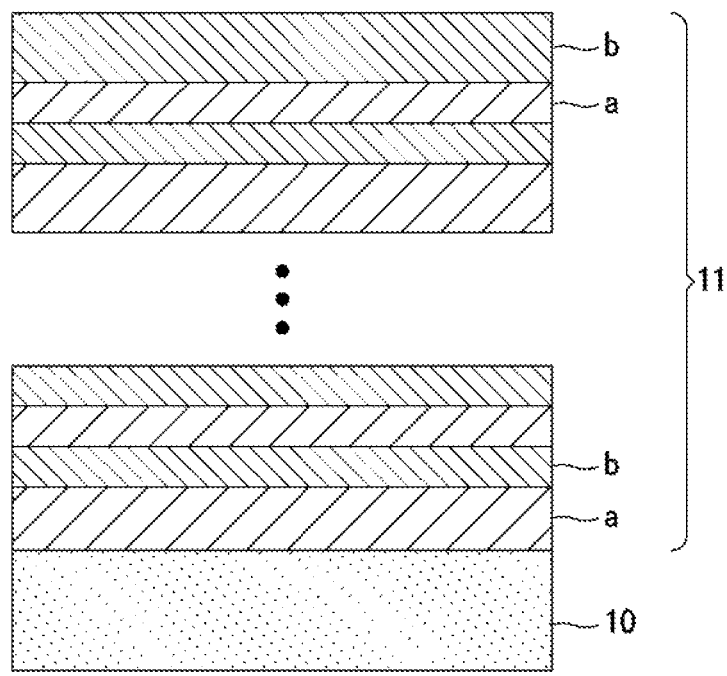
FIG. 1 is a schematic cross-sectional view of an example of an Rd-AR film.

Embodiments of the present invention will be described in detail in the order shown below, with reference to the drawings.

1. Phase difference compensating element
    1.1 Phase-difference-adding antireflection layer
    1.2 Birefringent layer
    1.3 Phase difference compensating element including a birefringent layer and an antireflection layer
2. Method of manufacturing a phase difference compensating element
3. Example application to a projection-type image projecting device
4. Examples <1. Phase Difference Compensating Element<

A phase difference compensating element according to this embodiment includes: a birefringent layer in which obliquely-deposited films having a thickness equal to or smaller than the used wavelength are stacked; and a phase-difference-adding antireflection layer that is formed with two or more kinds of dielectric films having different refractive indexes, and provides an arbitrary phase difference, in addition to a phase difference in obliquely-incident transmitted light in the birefringent layer. With this phase difference compensating element, the in-plane phase difference R0 is controlled in the birefringent layer, and the phase difference Rd in obliquely-incident transmitted light is controlled while reflection is prevented in the phase-difference-adding antireflection layer. Accordingly, polarization disturbance can be effectively compensated.

In a case where the phase difference compensating element of this embodiment is provided in a liquid crystal projector that has liquid crystal molecules vertically-oriented in a non-electrolytic manner, for example, a phase difference that is the opposite of the obliquely-incident light phase difference generated in the birefringent layer is provided, and further, the value of the phase difference is controlled. With this, the polarization disturbance caused by the pretilt angle of a reflective light modulating element is corrected by the birefringent layer, and polarization disturbance caused by light obliquely-incident on the reflective light modulating element is corrected by the phase-difference-adding antireflection layer. Further, reflection can be prevented by the phase-difference-adding antireflection layer. Accordingly, high contrast can be achieved.

<1.1 Phase-difference-adding Antireflection Layer>

First, the phase-difference-adding antireflection layer that provides an arbitrary phase difference, in addition to a phase difference in obliquely-incident transmitted light in the birefringent layer, is described.

An optical multi-layer film called a structural birefringence normally does not use the interference effect of light in generating a phase difference Rth in the thickness direction. For example, in a case where the two kinds of dielectric films are dielectric films a and dielectric films b, and 100 films are stacked, with each one structural unit being a stack of a dielectric film a and a dielectric film b, the thicknesses to of the dielectric films a are the same in the multi-layer film, and the thicknesses tb of the dielectric films b are also the same in the multi-layer film. According to WO 2009/001799 A, for example, the thicknesses of all the dielectric films are 15 nm. Such a conventional optical multi-layer film needs to have an antireflection film on either side thereof.

Meanwhile, the phase-difference-adding antireflection layer of this embodiment also functions as an antireflection film, using a phase difference generated by oblique incidence on the dielectric films, and further actively using the interference effect of light. That is, the phase-difference-adding antireflection layer of this embodiment enables independent design of a phase difference for obliquely-incident light that is not easily controlled by oblique deposition.

Furthermore, there is no need to form an antireflection film, as the phase-difference-adding antireflection layer has an antireflection function.

Further, in the phase-difference-adding antireflection layer of this embodiment, the thicknesses of the respective films do not need to be the same, and the number of stacked layers can be made smaller. Specifically, the thicknesses of the respective films preferably differ from one another, and the number of stacked layers is preferably optimized. This aspect is fundamentally different from the conventional design concept. In the description below, the phase-difference-adding antireflection layer of this embodiment will be also referred to as the Rd-AR film.

FIG. 1 is a schematic cross-sectional view of an example of the Rd-AR film. As shown in FIG. 1, this Rd-AR film 11 is a dielectric multi-layer film formed by alternately stacking high refractive index dielectric films a and low refractive index dielectric films b on a base material 10.

The Rd-AR film has an antireflection function in a desired wavelength band, and provides an arbitrary phase difference to obliquely-incident light having a predetermined angle. Therefore, antireflection and a phase difference in obliquely-incident light needs to be designed.

The Rd-AR film can also be designed for visible light bands, but is preferably designed for each of the wavelength bands of the three primary colors: the Red wavelength band (590 to 700 nm, for example), the Green wavelength band (510 to 590 nm, for example), and the Blue wavelength band (425 to 505 nm, for example). A dielectric material has wavelength dispersion of refractive indexes, and a phase difference in obliquely-incident light also has wavelength dispersion. Therefore, it is difficult to design a constant phase difference in a visible light band. However, with the three primary colors of RGB, wavelength dispersion of a phase difference in obliquely-incident light can be restrained, and antireflection can be easily designed.

The dielectric films used in the Rd-AR film may be made of an oxide such as $TiO_2$, $SiO_2$, $Ta_2O_5$, $Al_2O_3$, $CeO_2$, $ZrO_2$, ZrO, or $Nb_2O_5$, or a combination of them. In this embodiment, $Nb_2O_5$ is preferably used as the high refractive index dielectric films a, and $SiO_2$ is preferably used as the low refractive index dielectric films b.

In relation to the used wavelength $\lambda$, the thickness ta of the high refractive index dielectric films a and the thickness tb of the low refractive index dielectric films b preferably satisfy the relationships, $\lambda/100 \leq ta$, $tb \leq \lambda/2$. The phase difference Rd generated by oblique incidence on the dielectric films can have a constant phase difference sign, as the film thickness is $\lambda/2$ or smaller. Also, as the film thickness is $\lambda/100$ or greater, a phase difference can be generated.

The number d of the dielectric films preferably satisfies the relationship, $8 \leq d \leq 1000$. If the number d of the dielectric films is smaller than 8, the wavelength dispersion of the phase difference Rd becomes larger. If the number d of the dielectric films is 1000 or greater, the lead time becomes longer.

The thicknesses of almost all the dielectric films preferably differ from one another. So as to form an antireflection film while providing an arbitrary phase difference Rd, it is critical to finely adjust the thicknesses of the respective films, and actively use light interference.

Figure 2:
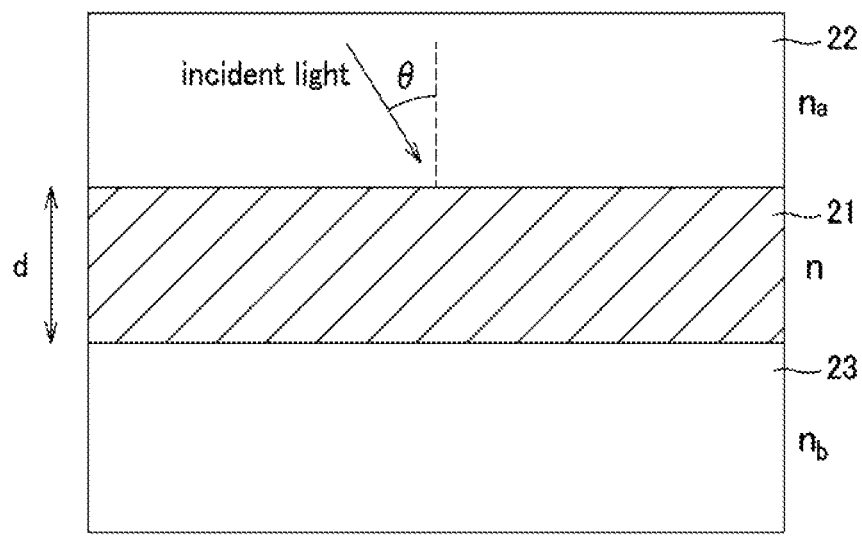
FIG. 2 is a cross-sectional view of an example of an optical thin film.

In the description below, the thicknesses of the dielectric films will be described in greater detail. FIG. 2 is a cross-sectional view of an example of an optical thin film. This optical thin film 21 has a thickness d and a refractive index n, and is interposed between a medium 22 having a refractive index na and a medium 23 having a refractive index nb.

Here, there is no absorption in any of the mediums. The Fresnel coefficients with respect to light incident on the first interface at an incidence angle θ from the side of the medium 22 are $r_{pa}$, $r_{sa}$, $t_{pa}$, and $t_{sa}$, and the Fresnel coefficients on the interface of the other medium 23 are $r_{pb}$, $r_{sb}$, $t_{pb}$, and $t_{sb}$. Here, r represents the reflection coefficient, t represents the transmission coefficient, and p and s each represent polarization.

Where the transmission coefficients of this single-layer optical thin film are $\tau^p$ and $\tau^s$, the relationship can be expressed by the equation (1).

[Mathematical Formula 1]

$$\tau^{p,s} = t_a t_b + t_a r_b r_a t_b \exp(i 2\pi d \cos\phi/\lambda) + \ldots \quad (1)$$
$$= \frac{t_a t_b}{1 - r_a r_b \exp(i 2\pi d \cos\phi/\lambda)}$$

There is also the relationship expressed by the equation (2).

[Mathematical Formula 2]

$$n_\alpha \sin\theta = n \sin\phi \quad (2)$$

If there is no absorption in the mediums, t and r in the Fresnel coefficients are real numbers. Where the equation (1) is rationalized, the equation (3) is obtained.

[Mathematical Formula 3]

$$\tau^{p,s} = \frac{t_a t_b (1 - r_a r_b \exp(-i 2\pi d \cos\phi/\lambda))}{1 + r_a^2 r_b^2 - r_a r_b \cos(2\pi d \cos\phi/\lambda)} \quad (3)$$

Accordingly, the transmission coefficients $\tau^p$ and $\tau^s$ are expressed by the equations (4) and (5), respectively.

[Mathematical Formula 4]

$$\tau^p = \alpha \exp(i\delta) \quad (4)$$

$$\tau^s = \beta \exp(i\epsilon) \quad (5)$$

Here, α, δ, β, and ε are real numbers. When the incidence angle is not 0, δ and ε are normally not 0. Further, as is apparent from the equation (3), t and r vary in value depending on polarization, and therefore, there is a possibility that the values of δ and ε vary depending on polarization. That is, where the incidence angle is not 0, a phase difference can be generated.

Here, the Fresnel coefficients rp01, rs01, tp01, and ts01 of p-polarized light and s-polarized light from a medium 0 to another medium 1 are as follows.

[Mathematical Formula 5]

$$r_{01}^{p,s} = \frac{\eta_0^{p,s} - \eta_1^{p,s}}{\eta_0^{p,s} + \eta_1^{p,s}} \quad (6)$$

$$t_{01}^{p,s} = \frac{2\eta_0^{p,s}}{\eta_0^{p,s} + \eta_1^{p,s}} \quad (7)$$

However, there are the relationships expressed by the equations (8) and (9).

$$\eta_{0,1}^p = \frac{n_{0,1}}{\cos\theta_{0,1}} \quad (8)$$

$$\eta_{0,1}^s = n_{0,1} \cos\theta_{0,1} \quad (9)$$

A phase differences can be calculated by substituting this into the equation (5).

Figure 3:
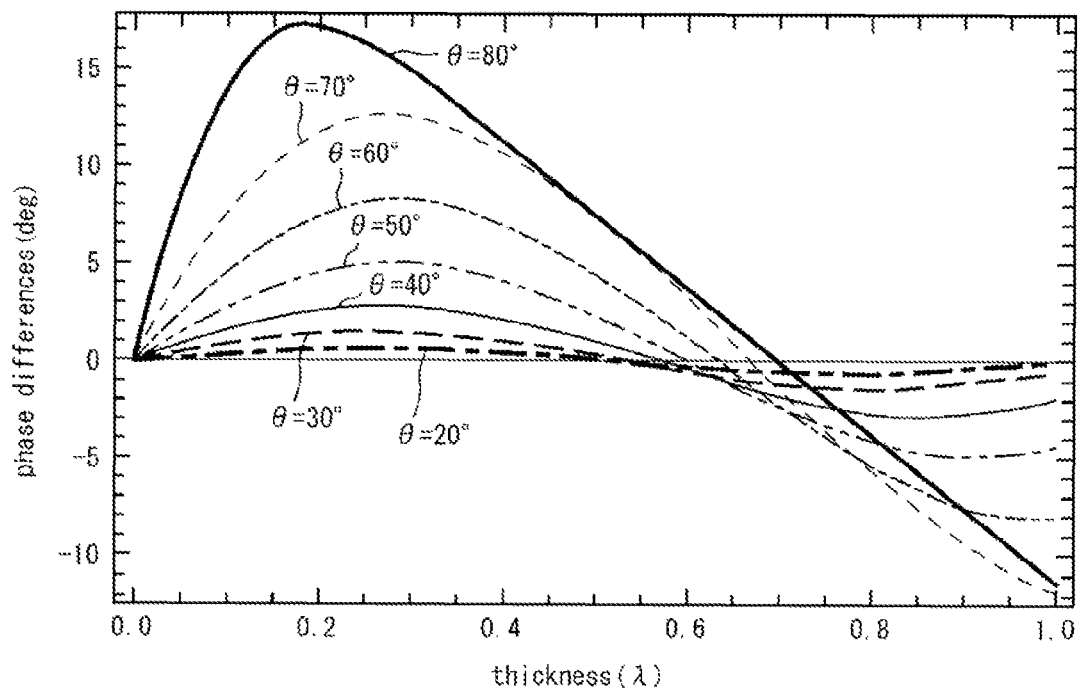
FIG. 3 is a graph showing the optical thickness dependence of phase differences generated when the angle of incident light θ was varied in a structure having the refractive indexes of 1, 1.41, and 1.

For example, in the structure shown in FIG. 2, the refractive indexes may be na=nb=1, and n=1.41. The optical thickness dependence of phase differences generated when the angle of the incident light θ is varied in such a case is shown in the graph in FIG. 3. Before the optical thickness reaches λ/2, the signs of the phase differences are the same. After the optical thickness becomes λ/2 or greater, particularly when θ is small, the signs are inverted.

Figure 4:
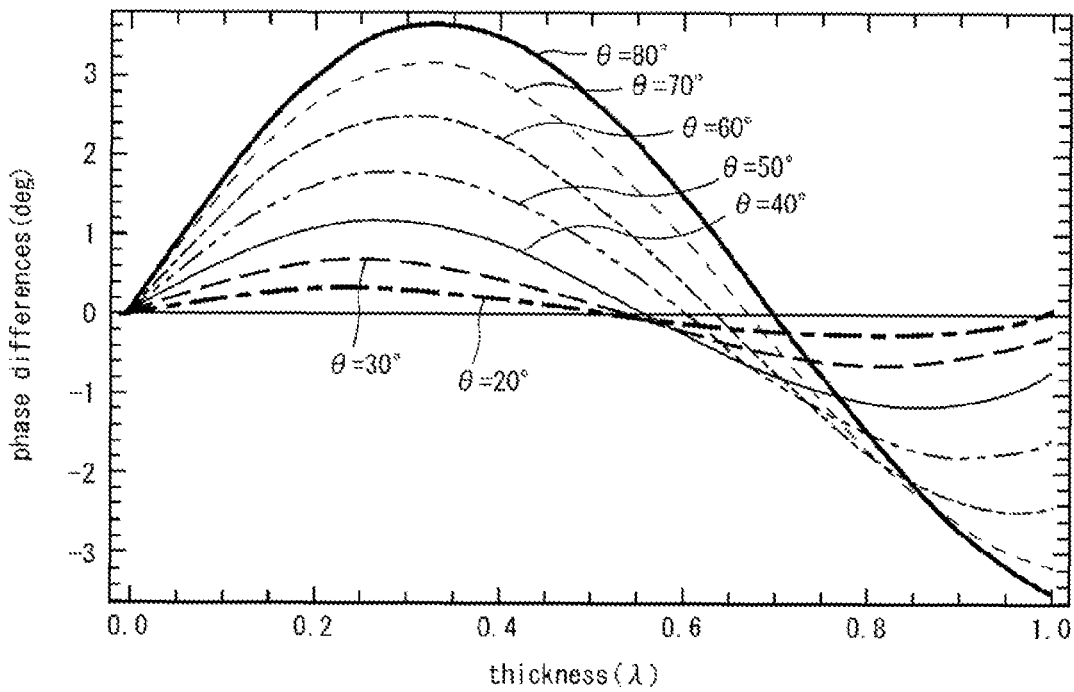
FIG. 4 is a graph showing the optical thickness dependence of phase differences generated when the angle of incident light θ was varied in a structure having the refractive indexes of 2, 1.41, and 2.

Also, in the structure shown in FIG. 2, the refractive indexes may be na=nb=2, and n=1.41, for example. The optical thickness dependence of phase differences generated when the angle of the incident light θ is varied in such a case is shown in the graph in FIG. 4. Before the optical thickness reaches λ/2, the signs of the phase differences are the same. After the optical thickness becomes λ/2 or greater, particularly when θ is small, the signs are inverted, as in the case shown in FIG. 3.

As described above, where dielectric films having different refractive indexes in relative terms are stacked, the signs of phase differences generated in light are unidirectionally-oriented until the optical thickness reaches λ/2. Therefore, in a case where Rd is controlled with the use of the Rd-AR film, the optical thickness is preferably set at λ/2 or smaller. Also, as can be seen from FIGS. 3 and 4, phase differences are not easily generated when the optical thickness is too small. Therefore, the optical thickness is preferably λ/100 or greater.

Figure 5:
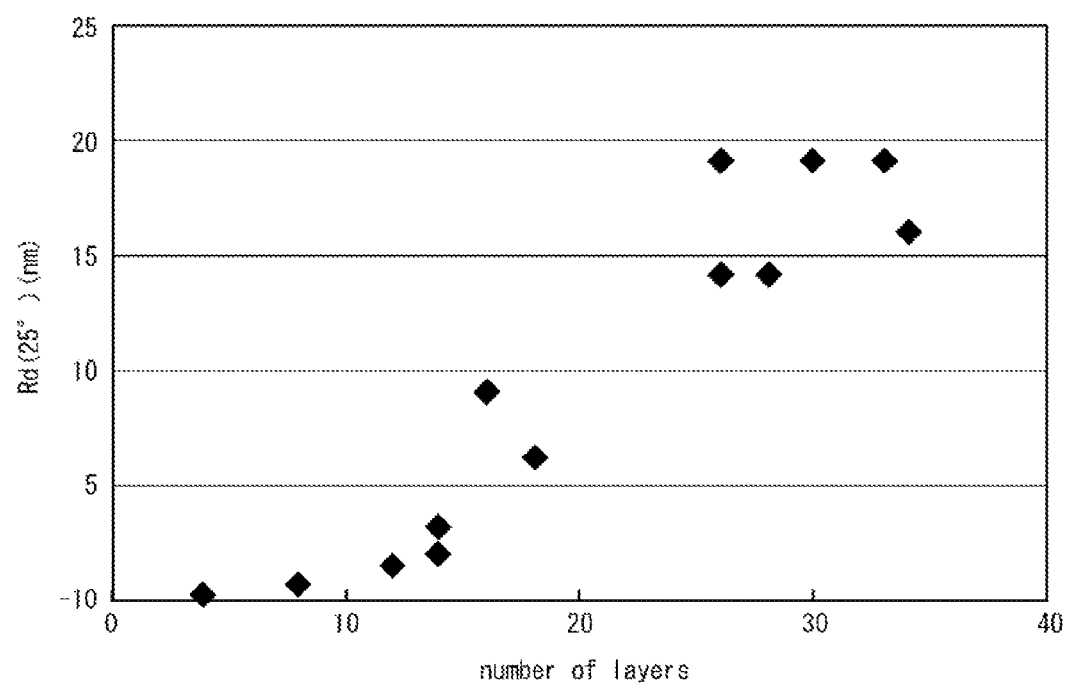
FIG. 5 is a graph showing the layer number dependence of phase differences Rd in obliquely-incident light when Rd-AR films were designed.

Next, the number of dielectric films in the Rd-AR film is described in greater detail. FIG. 5 shows the largest possible phase differences Rd to be provided when the number of layers in a dielectric multi-layer film was varied from four to 36, and Rd-AR films having the respective numbers of layers were designed. The ordinate axis indicates the absolute values of phase differences. The high refractive index dielectric films were made of $Nb_2O_5$, and the low refractive index dielectric films were made of $SiO_2$. The incident light angle was 25 degrees. As can be seen from the graph shown in FIG. 5, in designing the Rd-AR film, the largest possible phase difference Rd to be provided can be made larger as the number of dielectric films becomes larger.

Figure 6:
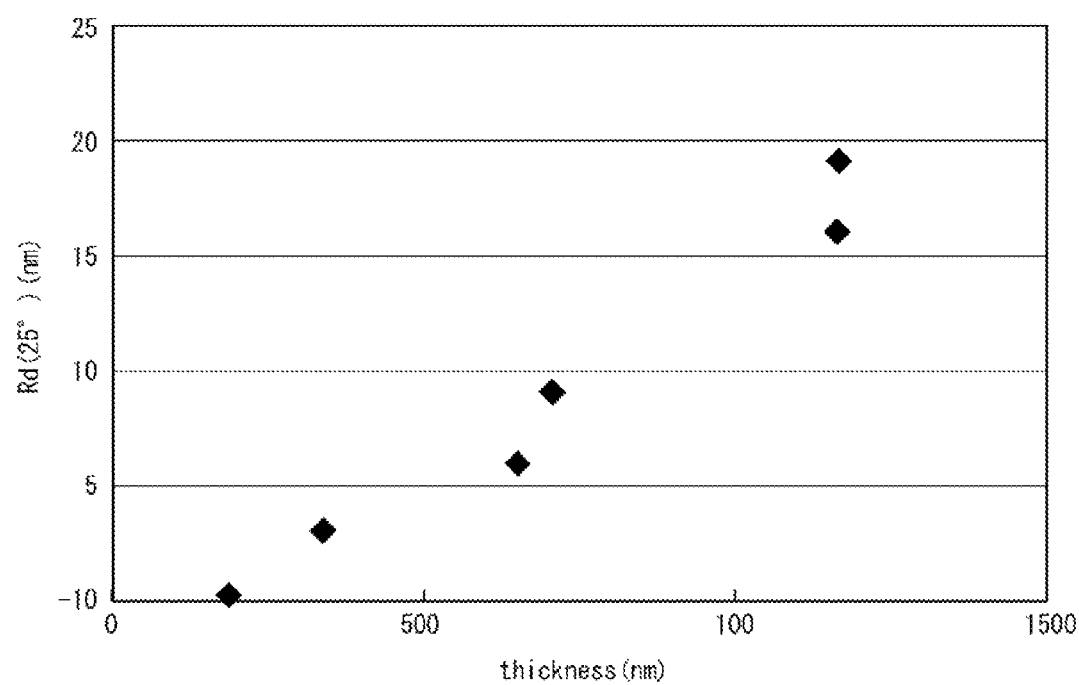
FIG. 6 is a graph showing the film thickness dependence of phase differences Rd in obliquely-incident light when Rd-AR films were designed.

FIG. 6 shows the largest possible phase differences Rd to be provided when the total thickness of the respective films in a dielectric multi-layer film was varied from 200 nm to 1300 nm, and Rd-AR films having the respective thicknesses were designed. The ordinate axis indicates the absolute values of phase differences. The high refractive index dielectric films were made of $Nb_2O_5$, and the low refractive index dielectric films were made of $SiO_2$. The incident light angle was 25 degrees. As can be seen from the graph shown in FIG. 6, the largest possible phase difference Rd to be provided can be made larger as the total thickness of the Rd-AR film becomes larger.

Figure 7:
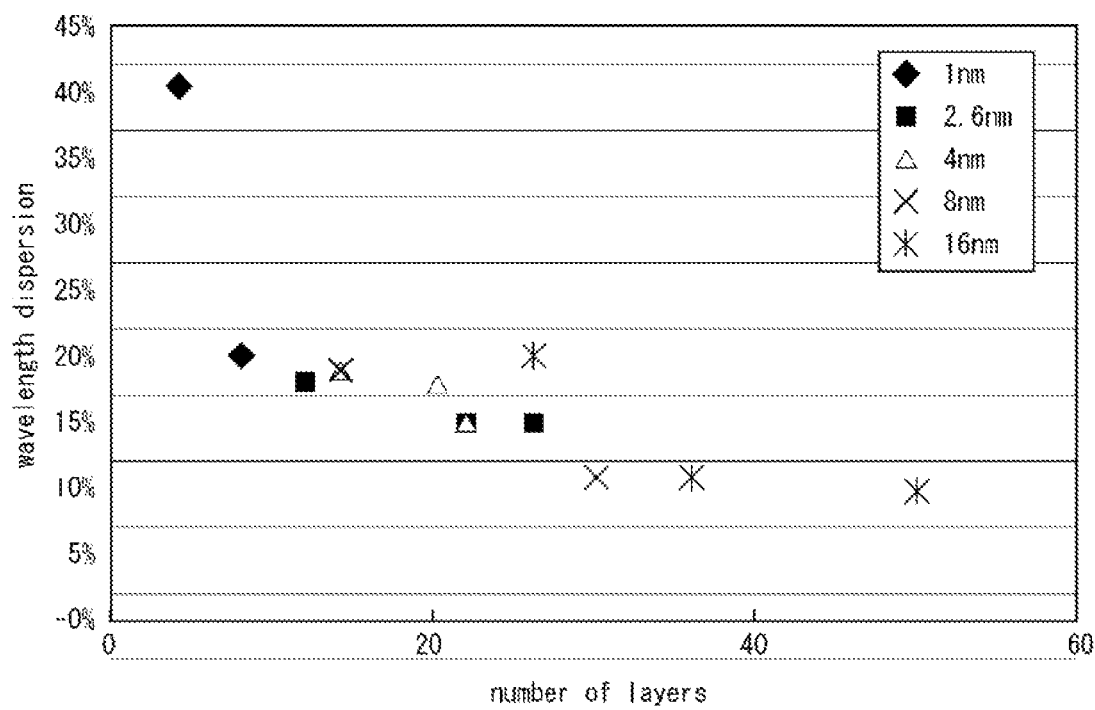
FIG. 7 is a graph showing the relationship between the numbers of stacked layers in the Blue wavelength band and wavelength dispersion of phase differences Rd.

FIG. 7 is a graph showing the relationship between the numbers of stacked layers and the wavelength dispersion of phase differences Rd in cases where the phase differences Rd (25 degrees) in 25-degree obliquely-incident light that passes through the phase difference compensating element have target values of 1 nm, 2.6 nm, 4 nm, 8 nm, and 16 nm in the Blue wavelength band. Wavelength dispersion means variations of phase differences Rd within a predetermined wavelength band. As can be seen from the graph shown in FIG. 7, where the number of layers is eight or more, dispersion of Rd can be restrained, and an excellent phase difference element can be formed. The same tendency is seen not only in the Blue wavelength band but also in the Green wavelength band and the Red wavelength band. Particularly, in a case where a large phase difference Rd is to be provided, dispersion can be restrained by increasing the number of layers. An antireflection film for a transparent base is normally formed with four to six films, but the Rd-AR film is preferably formed with eight or more films for the reasons stated above.

Next, a dielectric multi-layer film that includes a dielectric material having the highest refractive index NH in relative terms and a dielectric material having the lowest refractive index NL in relative terms is described.

In the Rd-AR film, the relationship between the dielectric material having the highest refractive index NH in relative terms and the dielectric material having the lowest refractive index NL in relative terms preferably satisfies the equation shown below.

$$0.4 < NH - NL < 1.5$$

Figure 8:
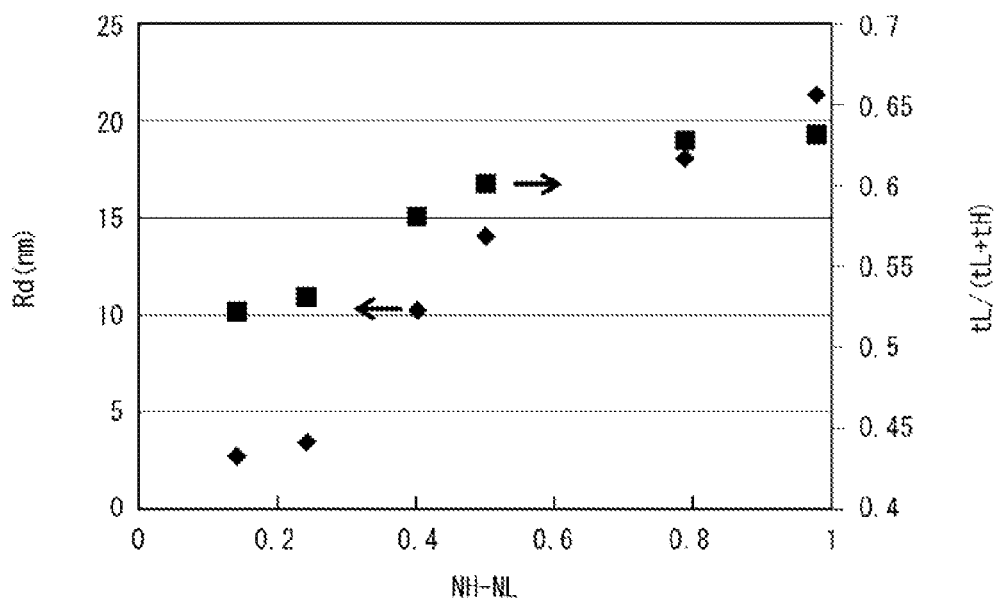
FIG. 8 is a graph showing the largest possible phase differences to be provided to 25-degree obliquely-incident light when dielectric multi-layer films are formed with a dielectric material having the highest refractive index NH in relative terms and a dielectric material having the lowest refractive index NL in relative terms.

FIG. 8 is a graph showing the largest possible phase differences to be provided to 25-degree obliquely-incident light when dielectric multi-layer films are formed with a dielectric material having the highest refractive index NH in relative terms and a dielectric material having the lowest refractive index NL in relative terms. The ordinate axis indicates the absolute values of phase differences. Where (NH−NL) is 0.4 or greater, relatively large phase differences Rd are easily provided. Where (NH−NL) is 1.5 or greater, however, there is a possibility that wavelength dispersion becomes larger.

Where the thickness of the dielectric material having the highest refractive index in relative terms is represented by tH, and the thickness of the dielectric material having the lowest refractive index in relative terms is represented by tL, the Rd-AR film preferably satisfies tL/(tH+tL)>0.4. As also shown in FIG. 8, in a case where a dielectric multi-layer film is formed with a dielectric material having the highest refractive index NH in relative terms and a dielectric material having the lowest refractive index NL in relative terms so as to provide the largest phase difference to 25-degree obliquely-incident light, tL/(tH+tL)>0.4 needs to be satisfied.

Figure 9:
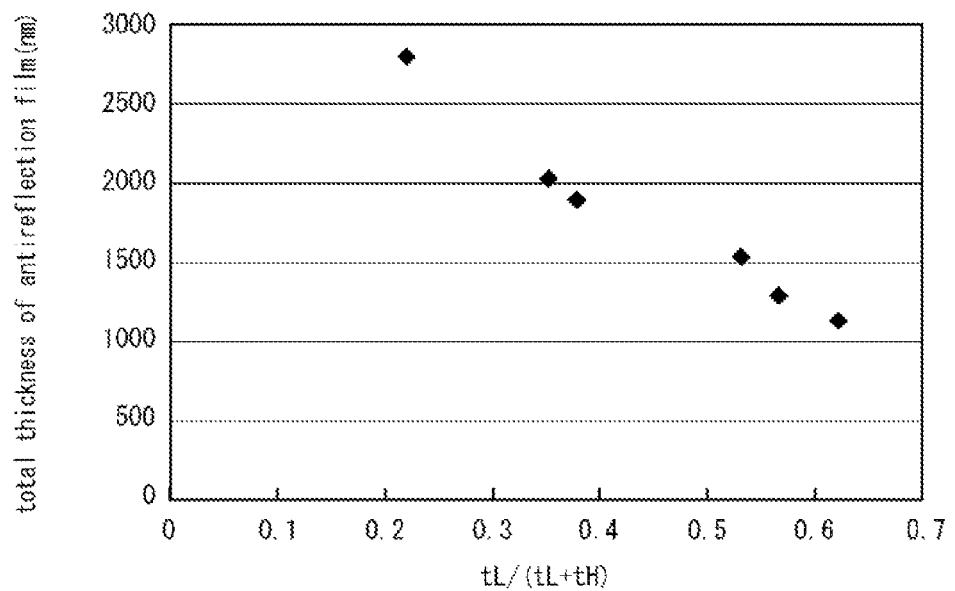
FIG. 9 is a graph showing the relationship between tL/(tH+tL) and thicknesses where a phase difference of 18 nm is generated in 25-degree obliquely-incident light.

FIG. 9 is a graph showing the relationship between tL/(tH+tL) and thicknesses where a phase difference of 18 nm is generated in 25-degree obliquely-incident light. The graph shows that, as tL/(tH+tL) becomes smaller, the thickness required for obtaining both an antireflection film and phase difference generation becomes greater. Therefore, it is preferable to satisfy tL/(tH+tL)>0.4.

As described above, the Rd-AR film provides a phase difference to obliquely-incident light having a predetermined angle, but does not have a birefringence with which the dielectric multi-layer film is represented by a negative C-plate. This is because the phase difference to be provided by the Rd-AR film is not defined by any birefringence. That is, the Rd-AR film is not formed as an index ellipsoid like a negative C-plate, but has a function to provide an arbitrary phase difference to light having a predetermined angle. This function can sufficiently correct a phase difference generated in obliquely-incident light passing through vertically-oriented liquid crystal molecules in a reflective light modulating element, for example.

<1.2 Birefringent Layer>

Next, the birefringent layer in which obliquely-deposited films having a thickness equal to or smaller than the used wavelength are stacked is described. The birefringent layer is an obliquely-deposited multi-layer film formed by stacking obliquely-deposited films having a thickness equal to or smaller than the used wavelength through oblique deposition. In the oblique deposition, particles of a high refractive index material enter the base material from an oblique direction, and the birefringent layer is formed by depositing the high refractive index material alternately from two directions that are symmetrical about the normal direction of the base material. The high refractive index material may be an oxide such as $Ta_2O_5$, $TiO_2$, $SiO_2$, $Al_2O_3$, $CeO_2$, $ZrO_2$, $ZrO$, or $Nb_2O_5$, or a combination of them. In this embodiment, a material containing $Ta_2O_5$ as a principal component is preferably used. For example, a material formed by adding 5 to 15 wt % of $TiO_2$ to $Ta_2O_5$ is preferably used.

In an obliquely-deposited film, due to an effect called self-shadowing, the density in a direction (the x-direction) perpendicular to the incident direction of the deposition particles in the plane of the base material is relatively high, and the density in a direction (the y-direction) parallel to the incident direction of the deposition particles in the plane of the base material is relatively low. When light enters this deposited film from the direction perpendicular to the base material, the density difference in the film density becomes a difference in refractive index, and a birefringence is generated. Where the refractive index in the x-direction is represented by Nx, and the refractive index of the y-direction is represented by Ny, the following relationship is established.

$$Nx > Ny$$

Where the phase difference generated in the plane of the base material at this point is represented by R0, the in-plane phase difference R0 is expressed by the equation shown below.

$$R0 = (Nx - Ny) \times t$$

Here, (Nx−Ny) is generally called a birefringence Δn. The birefringence Δn is determined by the refractive index of the deposited substance and the deposition conditions.

Since the in-plane phase difference R0 is the product of the birefringence Δn and the thickness t of the deposited film, the phase difference can be controlled by adjusting the film thickness, as long as the deposited film has a reasonably large birefringence Δn. Normally, the in-plane phase difference R0 required in a phase difference element is about 1 to 30 nm, and the value of a specific phase difference is determined by the pretilt angle of liquid crystals, for example. In this embodiment, the in-plane phase difference R0 can be set at a value within the range of 0<R0<1000 nm by controlling the deposited film thickness, and can be applied to a quarter-wave plate or a half-wave plate.

Further, where the phase difference in the thickness direction of the birefringent layer is represented by Rth, Rth is expressed by the equation shown below.

$$Rth = [Nz - (Nx + Ny)/2] \times d$$

In the equation, Nz represents the refractive index in the thickness direction of the birefringent layer.

According to JP 2005-172984 A and JP 2007-101764 A, so as to correct polarization disturbance caused in obliquely-incident light, the phase difference Rth is set at a predetermined value in a phase difference compensating element. During the oblique deposition, however, it is difficult to control Nx, Ny, and Nz independently of one another. If the deposition conditions or the like are changed, Nx and Ny vary at the same time, and, since the variations differ from each other, the birefringence Δn varies. Therefore, it is difficult to control Nx, Ny, and Nz independently of one another. Particularly, Nz is affected by the oblique particle shape, voids between particles, and the like. This makes control of Nx, Ny, and Nz even more difficult.

The birefringent layer of this embodiment corrects polarization disturbance caused by the pretilt angle of a reflective light modulating element, for example, using the in-plane birefringence generated by two or more obliquely-deposited multi-layer films formed through oblique deposition.

Figure 10:
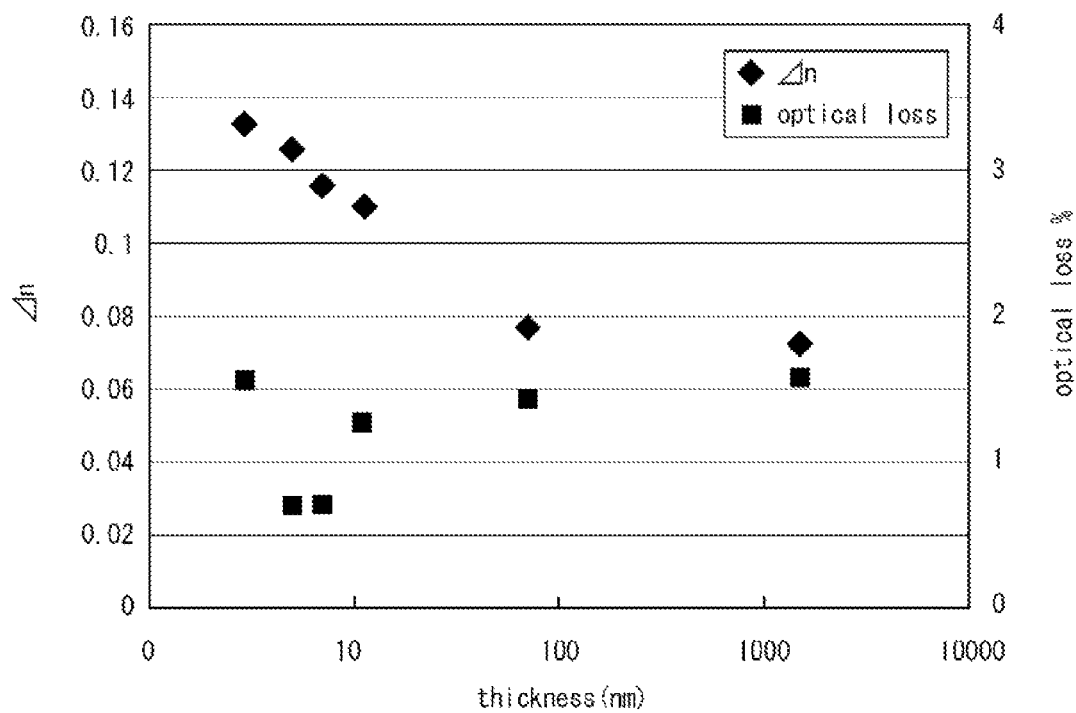
FIG. 10 is a graph showing variations in birefringence and optical loss observed when the thickness of each obliquely-deposited film was changed.

The thickness of each one obliquely-deposited film in the birefringent layer is not smaller than 5 nm and not greater than 100 nm, or more preferably, not smaller than 5 nm and not greater than 30 nm. FIG. 10 is a graph showing variations in birefringence and optical loss observed when the thickness of each obliquely-deposited film was changed. As shown in FIG. 10, the birefringence increases as the thickness of each one obliquely-deposited film increases. The optical loss decreases as the thickness increases. However, where the thickness is smaller than 5 nm, the optical loss increases. This is supposedly because, with a smaller thickness than 5 nm, an appropriate structure required for generating a birefringence is not formed. Therefore, the thickness of each one obliquely-deposited film is preferably 5 nm or greater.

Where the thickness of each one obliquely-deposited film is greater than 100 nm, on the other hand, the optical loss tends to increase. Further, in a case where the thickness of each one obliquely-deposited film is not sufficiently smaller than the wavelength of light, the phase difference for obliquely-incident light cannot be accurately measured. This is because, where films having a thickness not sufficiently smaller than the wavelength of light are stacked, the resultant structure behaves as if two phase difference elements having different birefringent axes were stacked, and simple evaluation cannot be made in terms of a refractive index difference and axis directions. In a case where films having a thickness sufficiently smaller than the wavelength of light are stacked, the birefringent axis of each layer can be ignored, and the resultant structure can be regarded as a phase difference compensating element in which all the layers have a single axis extending in a direction (z-direction) substantially perpendicular to the base material.

Meanwhile, the in-plane phase difference R0 of the birefringent layer preferably satisfies 0<R0<1000 nm, and the in-plane refractive index (Nx−Ny) of the birefringent layer preferably satisfies 0.01<(Nx−Ny)<1. Also, in each obliquely-deposited film, Nx≠Ny≠Nz is preferably satisfied, or more specifically, Nx>Ny≠Nz is preferably satisfied.

Also, the phase difference generated in light incident on the birefringent layer preferably has angle dependence that is substantially symmetrical about the normal direction of the base material surface on which the birefringent layer is formed. Further, the light incidence direction serving as the center of the angle dependence of the phase difference of the birefringent layer is preferably almost equal to the normal direction of the base material surface on which the Rd-AR film is formed.

<1.3 Phase Difference Compensating Element Including a Birefringent Layer and an Antireflection Layer>

As described above, a phase difference compensating element according to this embodiment includes: a birefringent layer in which obliquely-deposited films having a thickness equal to or smaller than the used wavelength are stacked; and an Rd-AR film that is formed with two or more kinds of dielectric films having different refractive indexes, and provides an arbitrary phase difference, in addition to a phase difference in obliquely-incident transmitted light in the birefringent layer.

The phase difference compensating element controls the in-plane phase difference R0 with the birefringent layer, and controls the phase difference Rd in obliquely-incident light with the Rd-AR film. No matter what value Rd takes when R0 is controlled, Rd is controlled with the Rd-AR film. Also, the Rd-AR film has an antireflection function. Accordingly, there is no need to form an antireflection film, and the lead time and the number of procedures in designing can be reduced. Also, the entire phase difference compensating element is made of an inorganic material, and accordingly, has great advantages in terms of light resistance and heat resistance. Also, the phase difference compensating element is manufactured by thin film processing, and accordingly, has a large number of benefits, such as easy control on phase differences and wide ranges of selectable types, thicknesses, and sizes of substrates.

Figure 11:
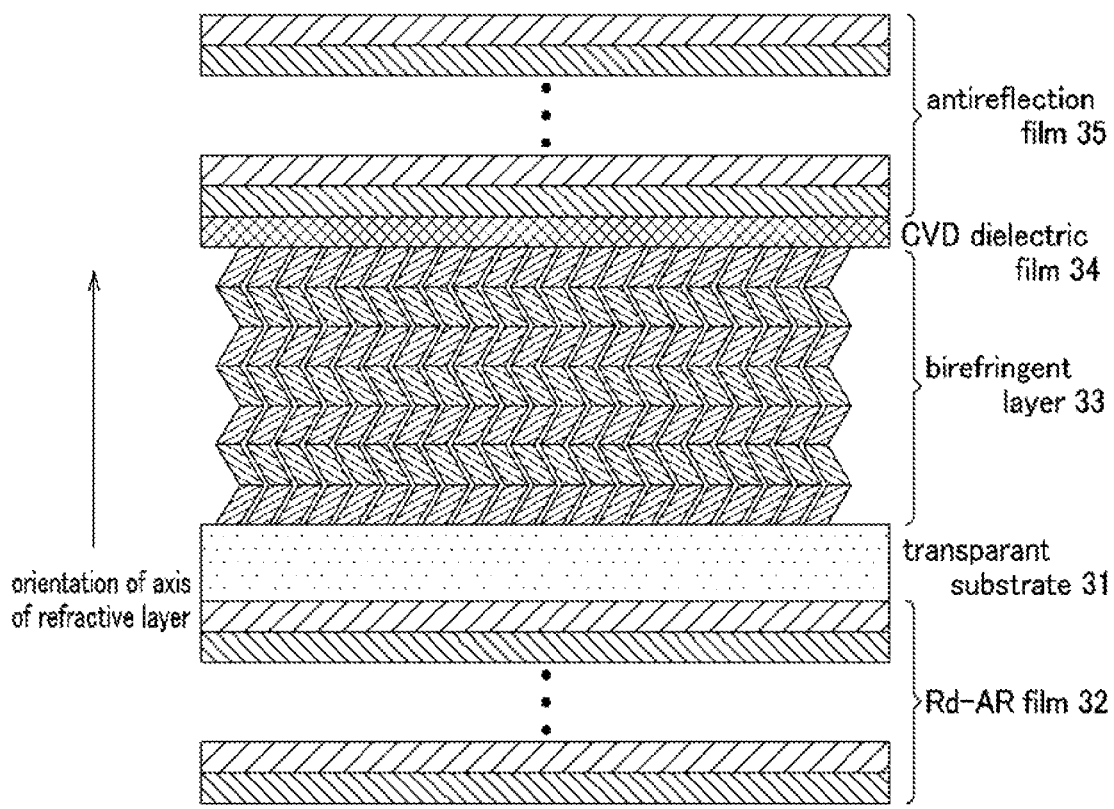
FIG. 11 is a cross-sectional view of an example of a phase difference compensating element.

FIG. 11 is a cross-sectional view of an example of a phase difference compensating element. As shown in FIG. 11, the phase difference compensating element includes a transparent substrate 31, an Rd-AR film 32 formed on one surface of the transparent substrate 31, a birefringent layer 33 formed on the other surface of the transparent substrate 31, a CVD (Chemical Vapor Deposition) dielectric film 34 formed on the birefringent layer 33, and an antireflection film 35 formed on the CVD dielectric film 34.

The transparent substrate 31 is made of a material that is transparent with respect to light in the used band and has a refractive index of 1.1 to 2.2, such as glass, quartz, or crystal. In this embodiment, it is preferable to use quartz as the material forming the transparent substrate 31. Quartz has excellent heat-resisting properties and a very low heat expansion coefficient, and the light transmission rate of quartz is remarkably high at all the wavelengths ranging from the ultraviolet to the infrared. Therefore, it is preferable to use quartz.

The Rd-AR film 32 is formed by stacking two or more kinds of dielectric films having different refractive indexes as described above, and provides an arbitrary phase difference, in addition to a phase difference in obliquely-incident transmitted light in the birefringent layer 33. Also, so as to equalize the signs of phase differences, the thickness t of the dielectric films preferably satisfies the relationship, $\lambda/100 \leq t \leq \lambda/2$, where $\lambda$ represents the used wavelength. Also, so as to reduce wavelength dispersion of the phase difference Rd, the number d of the dielectric films preferably satisfies the relationship, $8 \leq d \leq 1000$.

The birefringent layer 33 is an obliquely-deposited multi-layer film formed by stacking obliquely-deposited films having a thickness equal to or smaller than the used wavelength through oblique deposition, as described above. The birefringent layer 33 is formed by depositing deposition particles alternately from two directions that are symmetrical with respect to the normal direction of the substrate, and the thickness of each layer is preferably 30 nm or smaller.

The CVD dielectric film 34 is a high-density film, and can be obtained by forming a film through CVD. As this CVD dielectric film 34 is formed, moisture in the atmosphere can be prevented from entering or exiting from the birefringent layer 33.

The antireflection film (AR film) 35 is a multi-layer thin film formed with high refractive index films and low refractive index films, for example, and prevents surface reflection and improves transmittance.

With the phase difference compensating element having the above structure, the in-plane phase difference R0 is controlled in the birefringent layer, and the phase difference Rd in obliquely-incident transmitted light is controlled while reflection is prevented in the phase-difference-adding antireflection layer. Accordingly, polarization disturbance can be effectively compensated.

Figure 12:
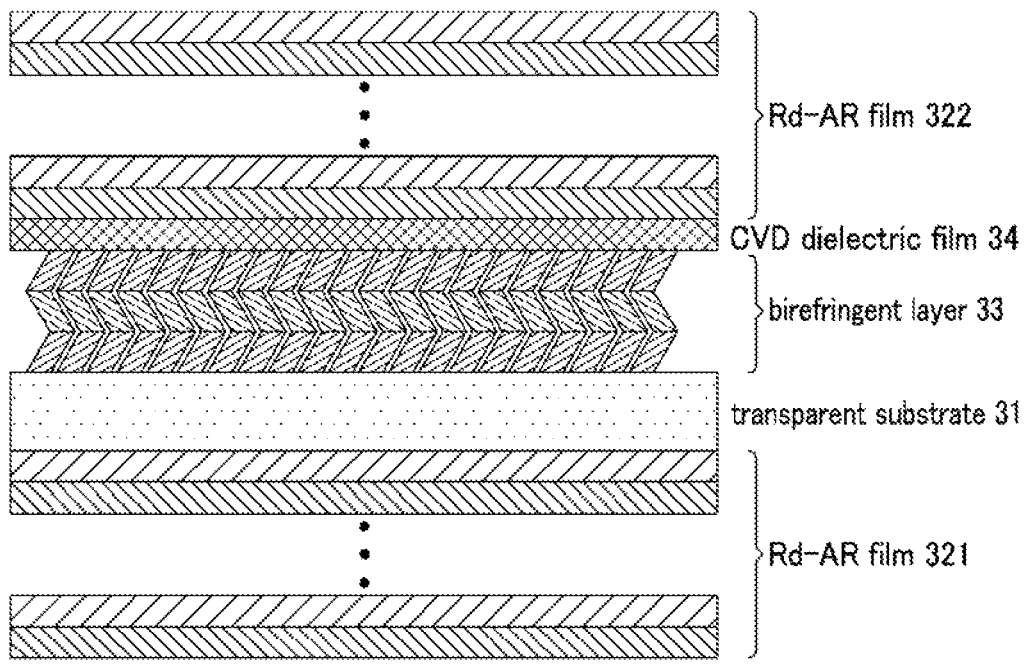
FIG. 12 is a cross-sectional view of an example of a phase difference compensating element.
Figure 13:
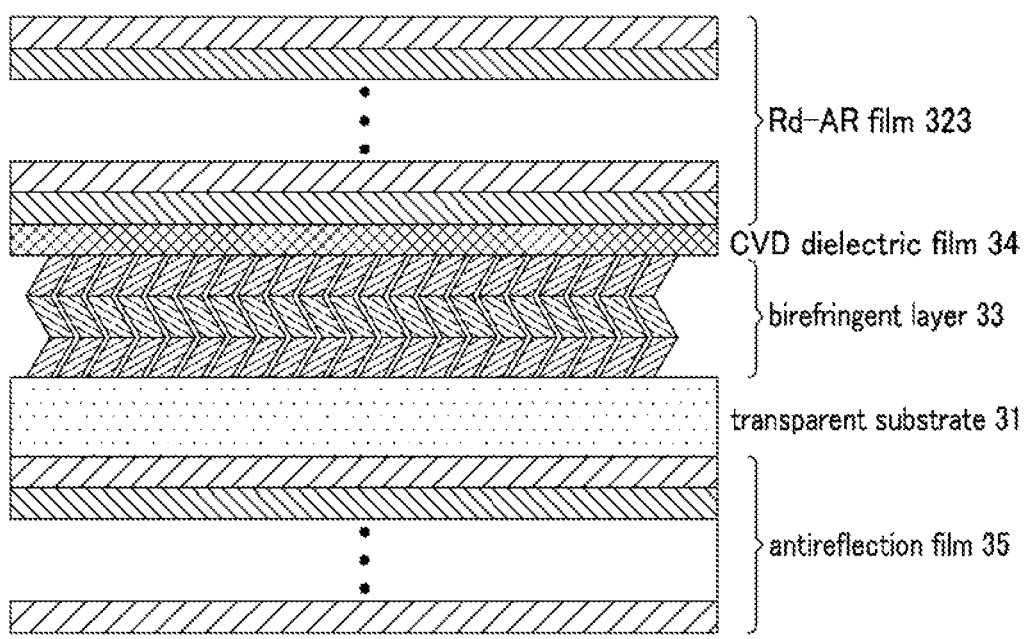
FIG. 13 is a cross-sectional view of an example of a phase difference compensating element.
Figure 14:
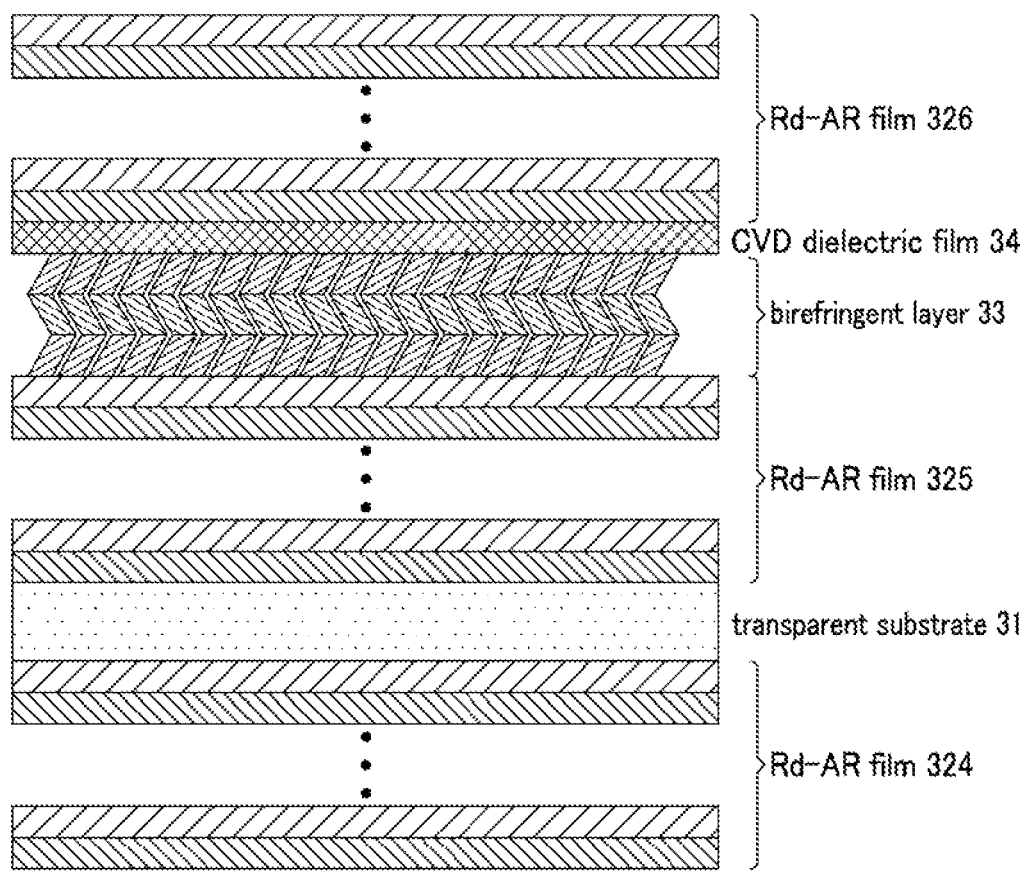
FIG. 14 is a cross-sectional view of an example of a phase difference compensating element.

Alternatively, an Rd-AR film 321, 322, or 323 may be formed on the birefringent layer 33 as in example structures of phase difference compensating elements shown in FIGS. 12 and 13, or Rd-AR films 324, 325, and 326 may be formed on both surfaces of the transparent substrate 31 as in an example structure of a phase difference compensating element shown in FIG. 14. In cases where more than one Rd-AR film is formed in a phase difference compensating element, the target phase difference Rd is the sum of phase differences of the respective Rd-AR films.

The phase difference compensating element shown in FIG. 12 includes a transparent substrate 31, an Rd-AR film 321 formed on one surface of the transparent substrate 31, a birefringent layer 33 formed on the other surface of the transparent substrate 31, a CVD dielectric film 34 formed on the birefringent layer 33, and an Rd-AR film 322 formed on the CVD dielectric film 34.

Meanwhile, the phase difference compensating element shown in FIG. 13 includes a transparent substrate 31, an antireflection film 35 formed on one surface of the transparent substrate 31, a birefringent layer 33 formed on the other surface of the transparent substrate 31, a CVD dielectric film 34 formed on the birefringent layer 33, and an Rd-AR film 323 formed on the CVD dielectric film 34.

Alternatively, the phase difference compensating element shown in FIG. 14 includes a transparent substrate 31, an Rd-AR film 324 formed on one surface of the transparent substrate 31, an Rd-AR film 325 formed on the other surface of the transparent substrate 31, a birefringent layer 33 formed on the Rd-AR film 325, a CVD dielectric film 34 formed on the birefringent layer 33, and an Rd-AR film 326 formed on the CVD dielectric film 34.

With such example structures, the stress difference between the dielectric multi-layer films on the two surfaces can be reduced, and warpage of the substrate can be made smaller. Also, in a case where a thin transparent substrate is used, and warpage of the substrate due to the stress of the Rd-AR film becomes a problem, a stress adjustment layer formed with a dielectric film is preferably formed on the transparent substrate 31, and the birefringent layer 33 is preferably formed on the stress adjustment layer side. Specifically, a 1- to 5000-nm dielectric film that has a refractive index close to the refractive index of the transparent substrate 31 and is made of $SiO_2$, for example, is inserted as a stress adjustment layer between the transparent substrate 31 and the birefringent layer 33. Inserted between the transparent substrate 31 and the birefringent layer 33, the stress adjustment layer does not greatly affect the reflection characteristics of the phase difference element.

<2. Method of Manufacturing a Phase Difference Compensating Element>

Figure 15:
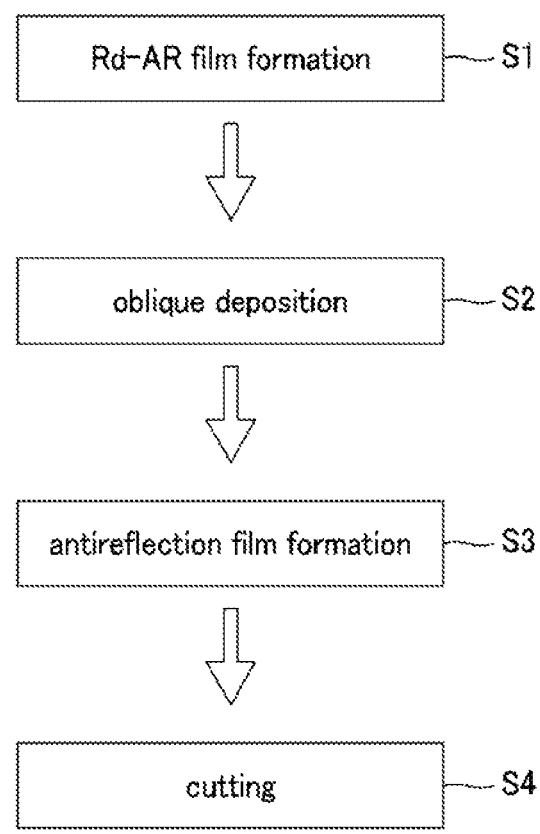
FIG. 15 is a flowchart showing a method of manufacturing a phase difference compensating element according to an embodiment of the present invention.

Next, a method of manufacturing a phase difference compensating element according to this embodiment is described. FIG. 15 is a flowchart showing a method of manufacturing a phase difference compensating element according to an embodiment of the present invention. A method of manufacturing a phase difference compensating element having the structure shown in FIG. 11 is described below.

First, in step S1, the Rd-AR film 32 is formed on one surface of the transparent substrate 31 by a sputtering technique, CVD, or a vapor deposition technique. As described above, an oxide such as $Ta_2O_5$, $TiO_2$, $SiO_2$, $Al_2O_3$, $CeO_2$, $ZrO_2$, $ZrO$, or $Nb_2O_5$, or a combination of them can be used as the dielectric material.

In step S2, the birefringent layer 33 is formed on the other surface of the transparent substrate 31 through oblique deposition. In the oblique deposition, a deposition material is deposited alternately from two directions that are symmetrical about the normal direction of the substrate.

Specifically, every time a film is formed, the transparent substrate 31 is rotated 180 degrees in the in-plane direction. In this manner, an obliquely-deposited film including a large number of layers in different film-forming directions is formed. Here, a multi-layer structure in which the thickness of each one layer is equal to or smaller than the used wavelength is formed. As described above, an oxide such as $Ta_2O_5$, $TiO_2$, $SiO_2$, $Al_2O_3$, $CeO_2$, $ZrO_2$, $ZrO$, or $Nb_2O_5$, or a combination of them can be used as the deposition material. The angle of rotation of the substrate is not limited to 180 degrees, and may be any angle depending on the purpose of use of the phase difference compensating element.

After the formation of the birefringent layer 33, an annealing treatment is performed to remove color and vaporize the moisture adsorbing between columnar structures. The annealing treatment is preferably performed at 100° C. or higher at which the moisture between columnar structures is sufficiently vaporized. If the temperature becomes too high, however, the columnar structures grow larger, and the void portions decrease, resulting in a lower birefringence, a lower transmittance, and the like. Therefore, the temperature is preferably not higher than 300° C. After the annealing treatment, the CVD dielectric film 34 with a high density is formed by plasma CVD, so as to prevent moisture in the atmosphere from entering or exiting from the birefringent layer 33.

In step S3, so as to improve transmittance, the antireflection film (AR film) 35 is formed on the CVD dielectric film 34 by sputtering. The AR film may be a multi-layer thin film formed with high refraction films and low refraction films that are generally used.

In step S4, cutting is performed to obtain structures of a desired size. In the cutting, a cutting device such as a glass scriber or a dicer can be used.

By the above manufacturing method, a phase difference element in which reflection of incident light is reduced and viewing angle dependence is improved can be obtained.

<3. Example Application to a Projection-type Image Projecting Device>

Next, an example application by which a phase difference compensating element according to this embodiment is mounted on a projection-type image projecting device is described.

In a phase difference compensating element used in a projection-type image projecting device, the phase difference Rd provided by the Rd-AR film preferably satisfies $1<Rd(\lambda)/Rd(\lambda')<1.5$ ($\lambda<\lambda'$), at an arbitrary wavelength $\lambda$ in the used wavelength band and within an incident light angle range of 0 to 25 degrees. If $Rd(\lambda)/Rd(\lambda')$ is 1.5 or greater, the wavelength dispersion might become much larger than the wavelength dispersion of the phase difference generated by liquid crystal molecules, and contrast might become lower. As $Rd(\lambda)/Rd(\lambda')$ is made smaller than 1.5, decreases in contrast can be restrained. Also, since the wavelength dispersion of liquid crystal molecules is normally 1 or larger, $Rd(\lambda)/Rd(\lambda')$ is preferably 1 or larger, too.

In the projection-type image projecting device, plane-polarized light is incident on an image displayed on liquid crystal cells, and predetermined plane-polarized light is extracted from elliptically-polarized light reflected by the pixels corresponding to the image on the liquid crystal cells and is projected onto a screen by a projection lens.

Figure 16:
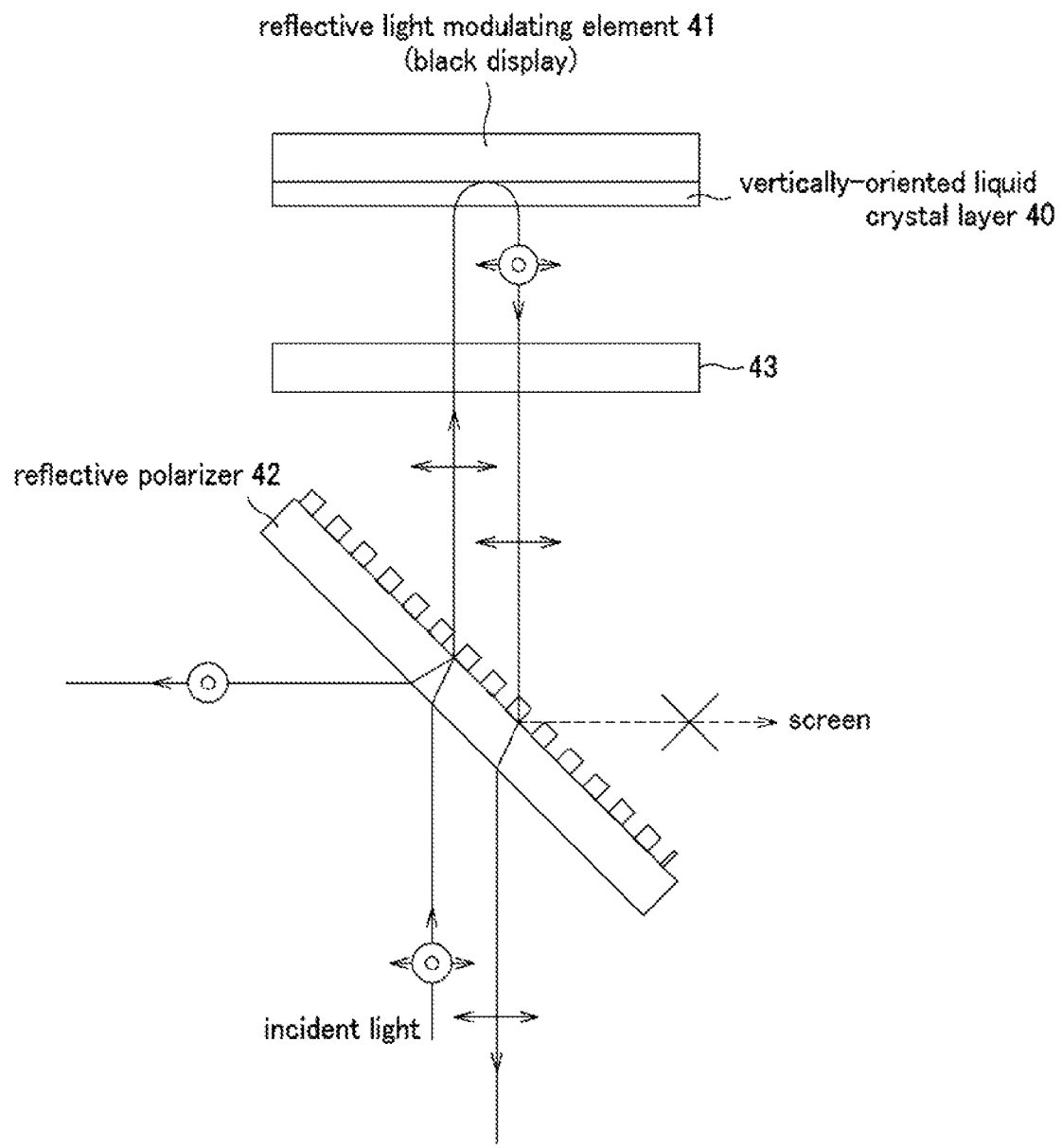
FIG. 16 is a schematic cross-sectional view of part of the structure of the optical engine used in a projection-type image projecting device.

FIG. 16 is a schematic cross-sectional view of part of the structure of the optical engine used in the projection-type image projecting device. This projection-type image projecting device is a reflective liquid crystal projector that includes a vertically-oriented liquid crystal layer 40, a reflective light modulating element 41, a phase difference compensating element 43, and a reflective polarizer 42. Here, the phase difference compensating element 43 includes a birefringent layer and a phase-difference-adding antireflection layer as described above, and the phase-difference-adding antireflection layer provides the opposite phase difference of the obliquely-incident light phase difference generated in the birefringent layer, and further controls the value of the phase difference. With this, the polarization disturbance caused by the pretilt angle of a reflective light modulating element 41 is corrected by the birefringent layer, and polarization disturbance caused by light obliquely-incident on the reflective light modulating element 41 is corrected by the phase-difference-adding antireflection layer. Further, reflection can be prevented by the phase-difference-adding antireflection layer. Accordingly, high contrast can be achieved.

In this reflective liquid crystal projector, light emitted from a light source is converted into plane-polarized light, is divided into the respective colors of R (red), G (green), and B (blue), and then enters the reflective polarizer 42 provided for the respective colors. The s-polarized light reflected by the polarization surface of the reflective polarizer 42 or the p-polarized light that passes through the polarization surface of the reflective polarizer 42 enters the vertically oriented liquid crystal layer 40 via the phase difference compensating element 43. Reflected light modulated at the respective pixels is then emitted, and is returned to the reflective polarizer 42 via the phase difference compensating element 43.

In the vertically-oriented liquid crystal layer 40, liquid crystal molecules are vertically-oriented in a no-voltage applied state (black state). When light flux vertically enters the reflective light modulating element 41 including this vertically-oriented liquid crystal layer 40, any birefringence is not generated. Therefore, light flux that has entered the reflective polarizer 42 and been turned into predetermined linearly-polarized light again enters and passes through the reflective polarizer 42, without any polarization disturbance. Thus, no light leaks into the screen.

Also, in a case where light has entered the reflective light modulating element 41 with a predetermined angle, the polarization state is disturbed by a birefringence. However, as the phase difference compensating element 43 is provided between the reflective light modulating element 41 and the reflective polarizer 42, polarized light is corrected, and thus, any of the light that has again entered the reflective polarizer 42 can be prevented from reaching the screen.

Also, in a case where the liquid crystal molecules are tilted at a predetermined angle (pretilt angle) with respect to the plane of the reflective light modulating element so as to restrain disturbance of the orientation of the liquid crystal molecules due to a transverse electric field and improve the response speed of the liquid crystal molecules, the polarization state of the light flux that has vertically entered the reflective light modulating element 41 is also disturbed by a birefringence. However, as the phase difference compensating element 43 is provided between the reflective light modulating element 41 and the reflective polarizer 42, polarized light is corrected, and thus, any of the light that has again entered the reflective polarizer 42 can be prevented from reaching the screen.

As described above, black luminance correction is performed with the use of a phase difference compensating element, so that contrast in a displayed image can be improved. A phase difference compensating element to which the present technology is applied is not limited to the above described example application, and can also be used in a quarter-wave plate or a half-wave plate that requires phase difference control for obliquely-incident light, for example. Also, a phase difference compensating element to which the present technology is applied can also be used in optical devices such as an optical pickup or a laser device.

4. Examples

In the description below, examples of the present invention will be explained. However, the present invention is not limited to these examples.

EXAMPLE 1

As Example 1, a phase difference compensating element having the structure shown in FIG. 11 was manufactured. A quartz substrate was used as the transparent substrate 31, and the Rd-AR film 32 was formed by alternately stacking the dielectric films a having a relatively high refractive index Na and dielectric films b having a relatively low refractive index Nb on one of the surfaces of the quartz substrate. The refractive indexes of the dielectric films a and the dielectric films b were Na=2.42 and Nb=1.48, respectively, at λ=450 nm.

FIG. 17 is a table showing the thicknesses of the respective films in the Rd-AR film of Example 1. The Rd-AR film of Example 1 was designed to function as an antireflection film in the Blue band, and provide a phase difference Rd (25) of approximately −16 nm to 25-degree obliquely-incident light passing through the phase difference compensating element. Here, the negative phase difference means a phase difference having the opposite sign from the phase difference in obliquely-incident light in the birefringent layer. The same will apply hereafter. As a result of measurement of the actually manufactured Rd-AR film, Rd (25)=−17 nm was obtained at a wavelength of 450 nm.

A deposition material containing $Ta_2O_5$ as a principal component was deposited on the opposite surface from the surface on which this Rd-AR film was formed, so that the deposition source was tilted at 70 degrees with respect to the normal direction of the substrate. In this process, every time 7-nm film formation was completed, the substrate was rotated 180 degrees in the in-plane direction, so that the birefringent layer 33 formed with obliquely-deposited multilayer films in different film-forming directions was manufactured. The thickness of the birefringent layer 33 was approximately 140 nm, so that the in-plane retardation R0 in the Blue band became 14 nm.

After the deposition, an annealing treatment was performed at 200° C., to remove color and vaporize the moisture adsorbing between columnar structures. After the annealing, a CVD dielectric film with a high density was formed by plasma TEOS-CVD, so as to prevent moisture in the atmosphere from entering or exiting from the obliquely-deposited films. After that, the antireflection film 35 having a five-layer structure formed with the dielectric films a having a relatively high refractive index Na and the dielectric films b having a relatively low refractive index Nb was formed, to complete the phase difference compensating element.

Figure 18:
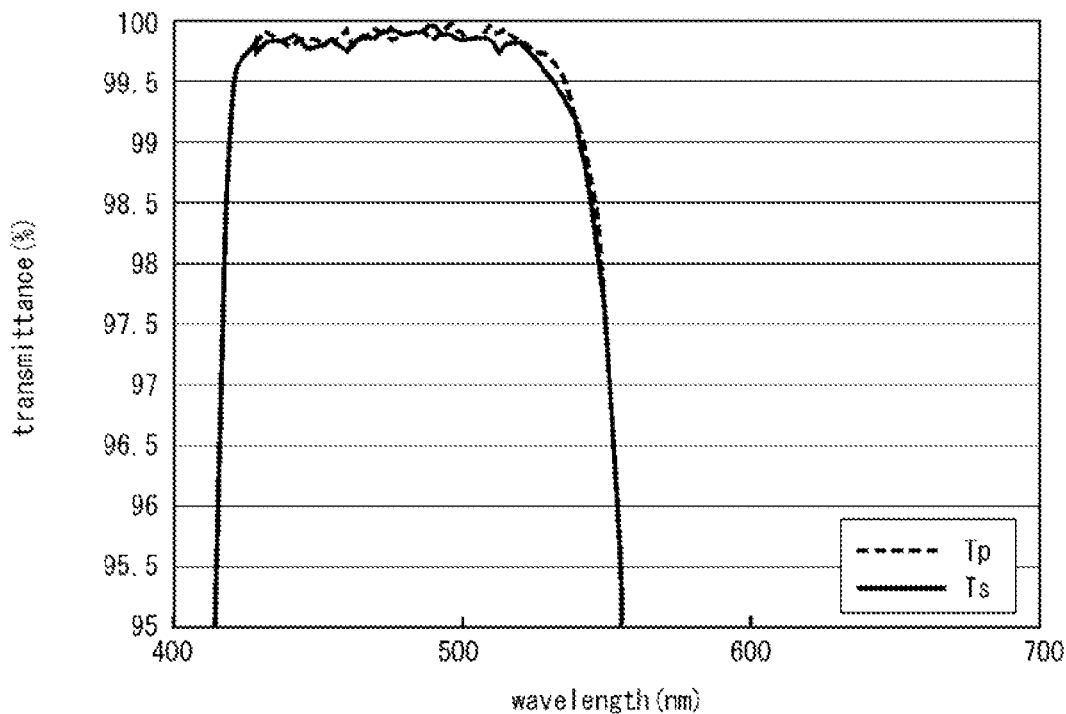
FIG. 18 is a graph showing the transmittance of a phase difference compensating element of Example 1.
Figure 19:
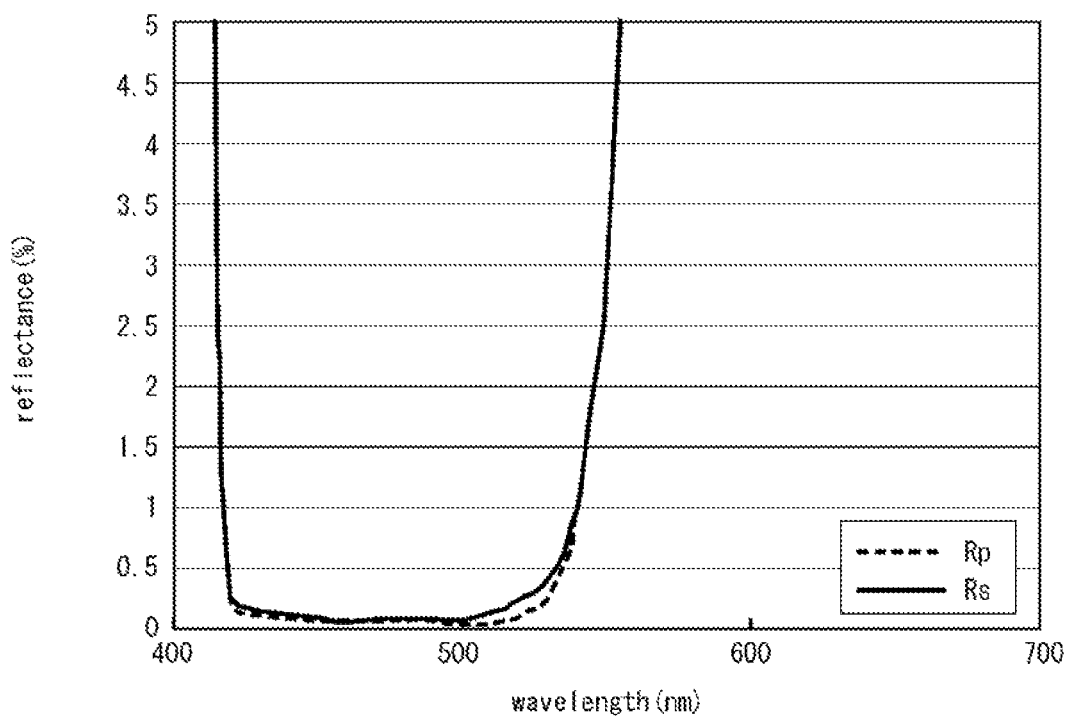
FIG. 19 is a graph showing the reflectance of the phase difference compensating element of Example 1.

FIGS. 18 and 19 are graphs showing the transmittance and the reflectance of the phase difference compensating element of Example 1, respectively. As shown in FIGS. 18 and 19, a phase difference compensating element having practical characteristics, such as a transmittance of 99.5% or higher and a reflectance of 0.2% or lower, was obtained. Also, in the phase difference compensating element, R0 was 14 nm, and Rd (25) was −16 nm. That is, the birefringent layer had a phase difference Rd (25) of approximately +1 nm in obliquely-incident light, and this was canceled by the Rd-AR film, to achieve Rd (25)=−16 nm. The phase difference compensating element of Example 1 was used in a projection-type image projecting device. The contrast obtained as a result was approximately twice as high as that with a phase difference compensating element not providing a phase difference to the antireflection film, for example.

Figure 20:
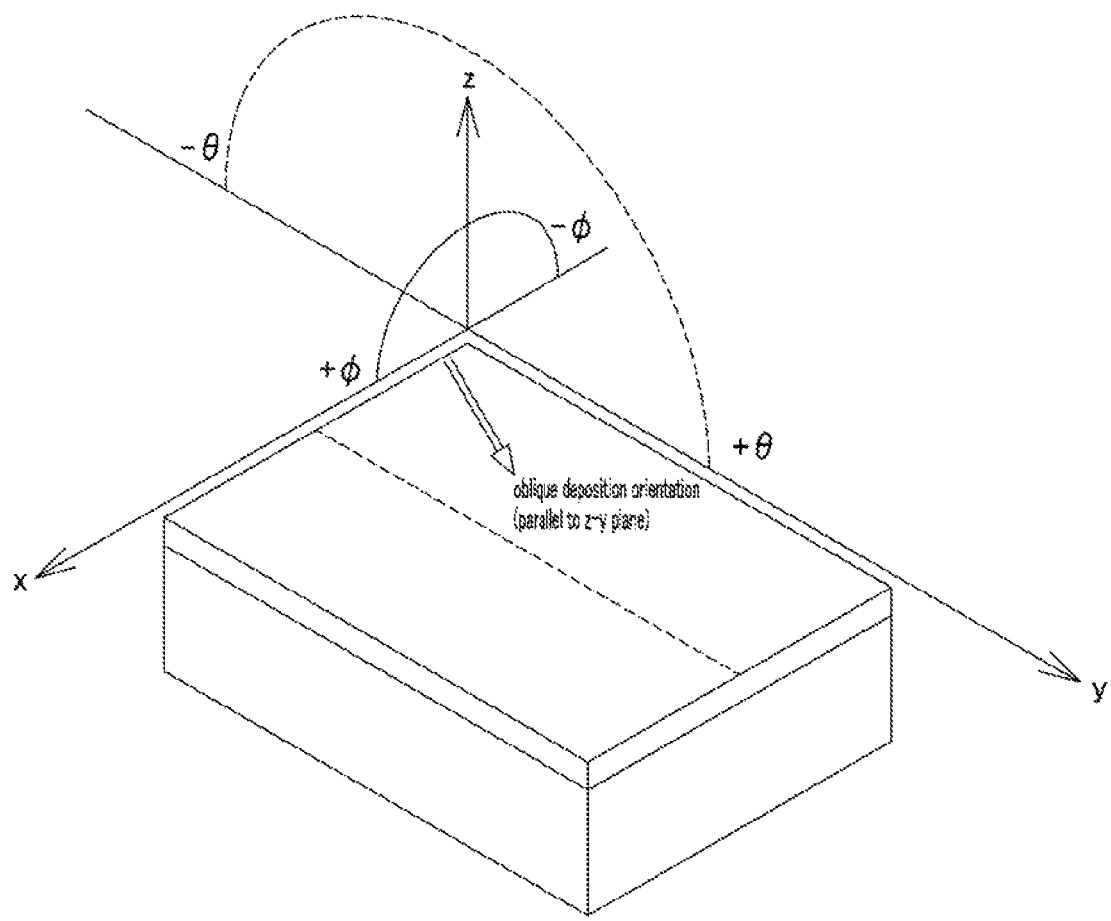
FIG. 20 is a schematic perspective view of a birefringent layer formed through oblique deposition.

Also, as the birefringent layer of the phase difference compensating element in Example 1 is an obliquely-deposited multi-layer film, an effect to improve angle dependence is achieved. FIG. 20 is a schematic perspective view of a birefringent layer formed through oblique deposition. In the plane of this element, the phase advancing axis (a direction parallel to the direction of oblique deposition) is the x-axis, the phase lagging axis (a direction perpendicular to the direction of oblique deposition) is the y-axis, and the normal direction of the element is the z-axis. Here, the angle of incident light from the z-axis direction is 0. The angle formed when incident light is tilted on the x-z plane is represented by θ, and the angle formed when incident light is tilted on the y-z plane is represented by φ.

Figure 21:
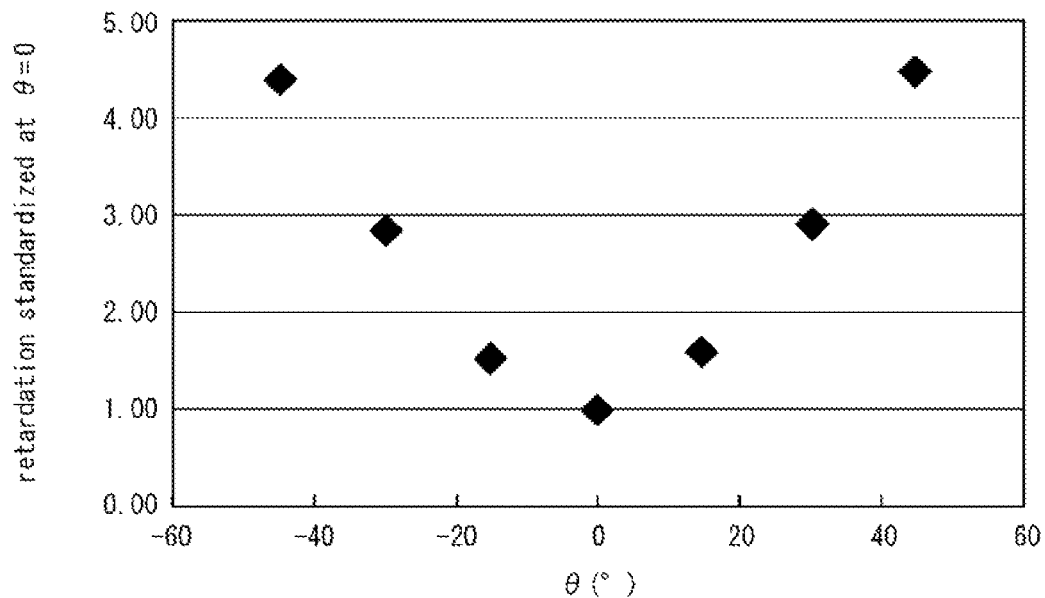
FIG. 21 is a graph showing the incident light angle (θ) dependence of the retardation of the phase difference compensating element of Example 1.
Figure 22:
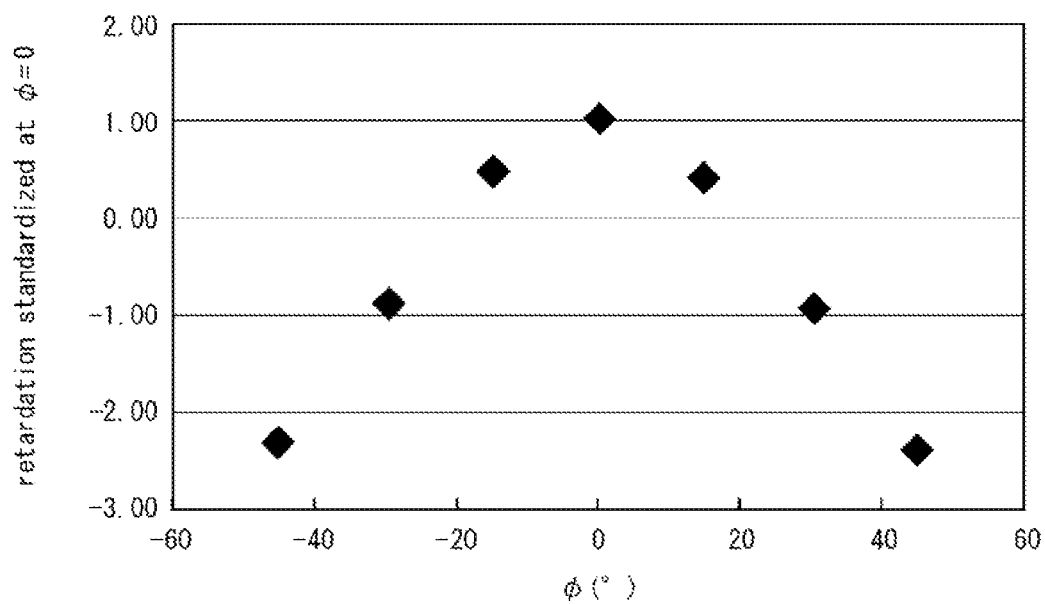
FIG. 22 is a graph showing the incident light angle (φ) dependence of the retardation of the phase difference compensating element of Example 1.
Figure 23:
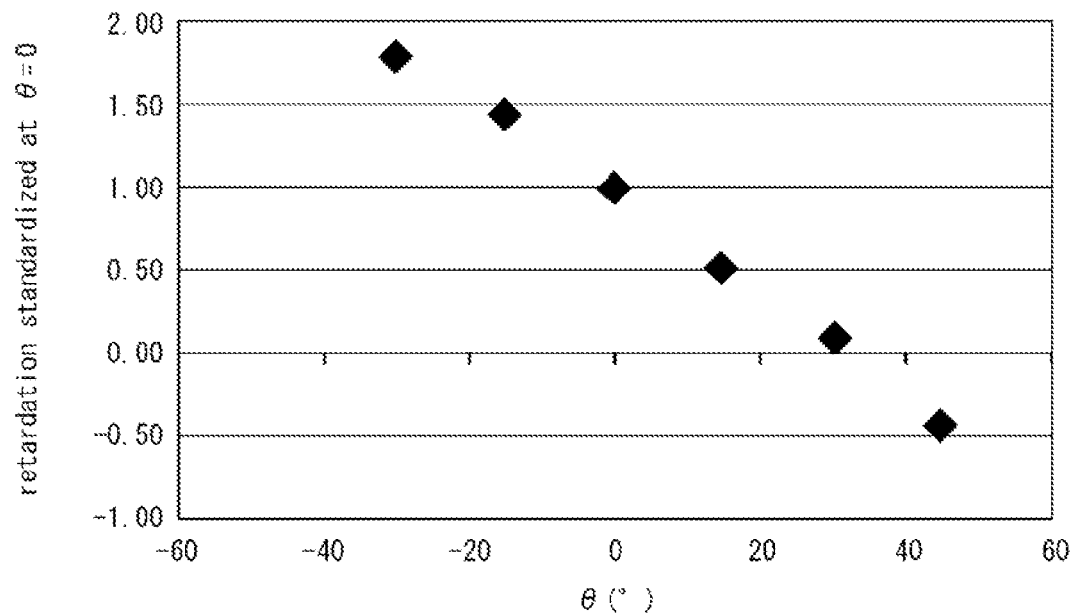
FIG. 23 is a graph showing the incident light angle (θ) dependence of the retardation of a phase difference compensating element including a birefringent layer that has a single-layer structure.
Figure 24:
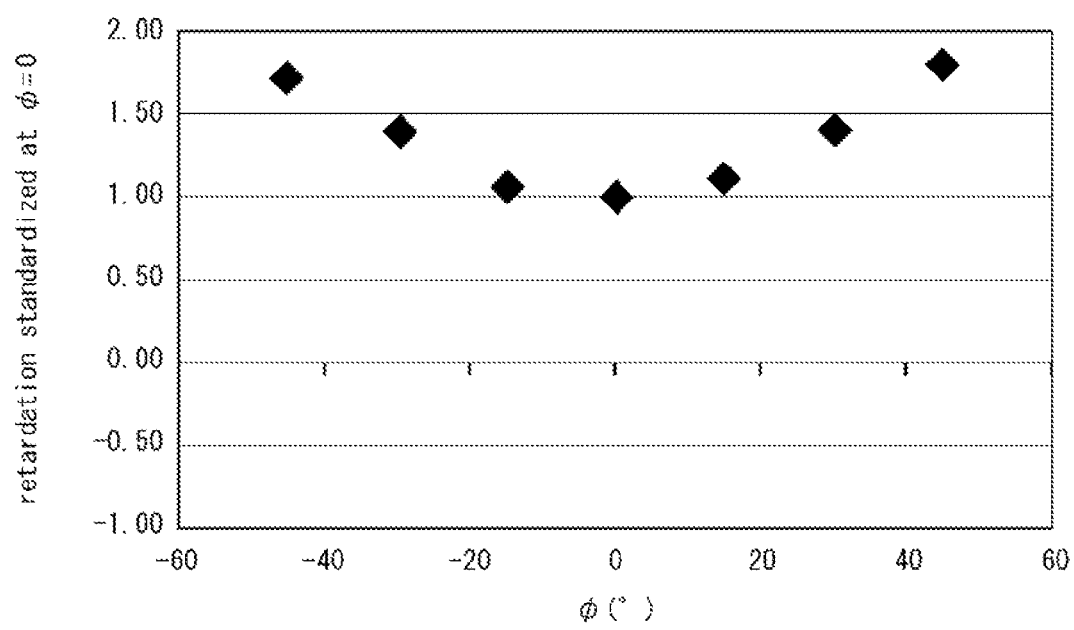
FIG. 24 is a graph showing the incident light angle (φ) dependence of the retardation of a phase difference compensating element including a birefringent layer that has a single-layer structure.
Figure 29:
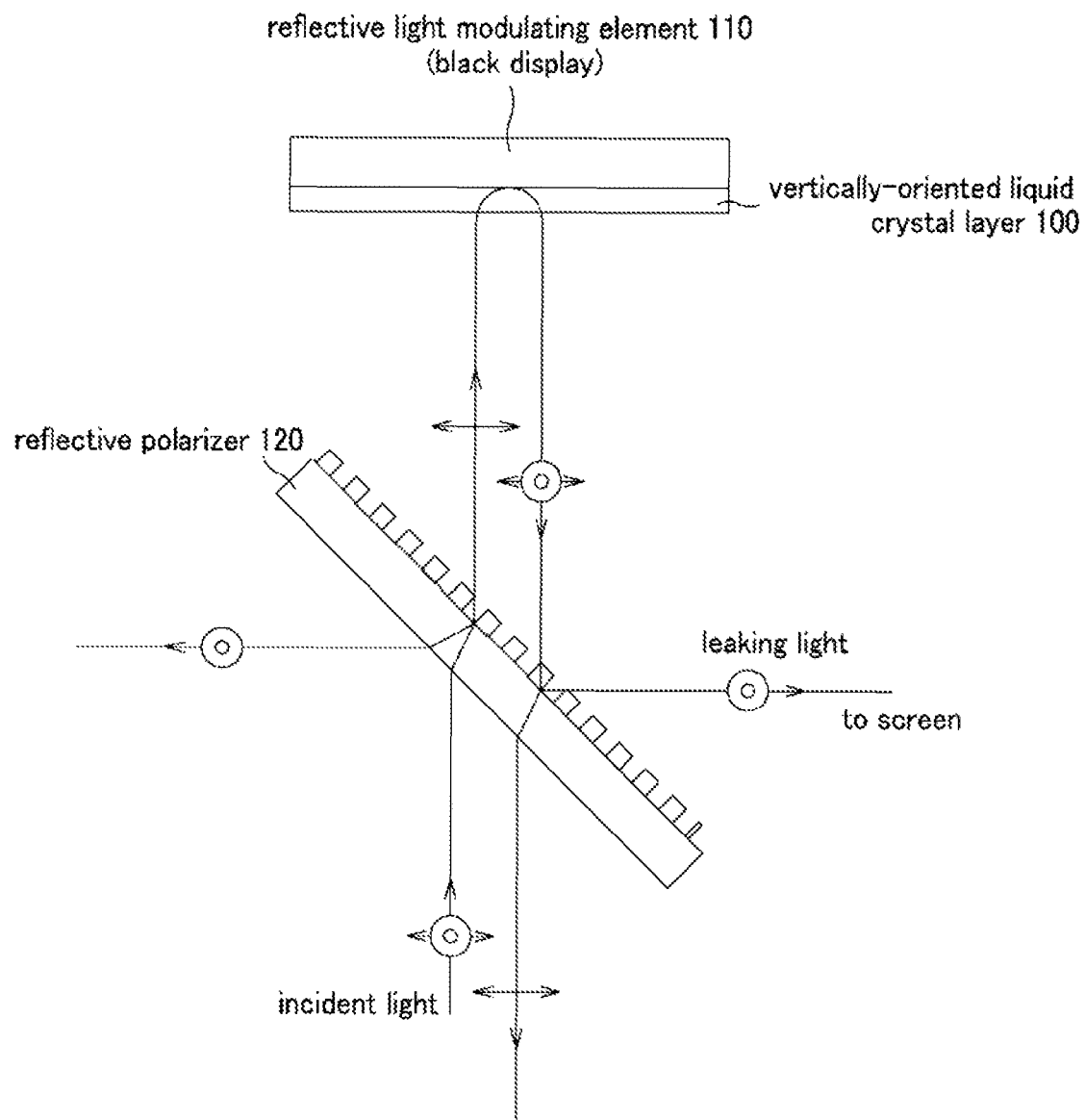
FIG. 29 is a schematic cross-sectional view of part of the structure of the optical engine used in a conventional projection-type image projecting device.

FIG. 21 is a graph showing the incident light angle (θ) dependence of the retardation of the phase difference compensating element of Example 1. FIG. 22 is a graph showing the incident light angle (φ) dependence of the retardation of the phase difference compensating element of Example 1. FIG. 23 is a graph showing the incident light angle (θ) dependence of the retardation of a phase difference compensating element including a birefringent layer that has a single-layer structure. FIG. 24 is a graph showing the incident light angle (φ) dependence of the retardation of a phase difference compensating element including a birefringent layer that has a single-layer structure. These are standardized with the value of the retardation when the incident light angle is 0.

As shown in FIGS. 21 and 22, in the phase difference compensating element of Example 1, the retardation distribution is symmetrical about the optical axis. In the cases where the birefringent layer has a single-layer structure, however, the retardations in the θ-direction are not symmetrical as shown in FIG. 23. This is because the columns grown by the oblique deposition have oblique structures.

As shown in FIGS. 21 and 22, in the phase difference compensating element of Example 1, the phase difference caused by incident light in the birefringent layer has angle dependence that is substantially symmetrical about the normal direction of a surface of the base material, and further, the incident light direction serving as the center of the angle dependence of the phase difference of the birefringent layer is substantially equal to the normal direction of the base material surface on which the Rd-AR film is formed.

Even in a stack structure, if the thickness of each one layer is not smaller than the wavelength of light, the retardations in the φ-direction cannot be accurately measured as described above. However, in a case where films each having a sufficiently smaller thickness than the wavelength of light are stacked as in each Example, the resultant phase difference compensating element can be regarded as a phase difference compensating element having an axis that is substantially perpendicular to the base material in all the layers. Thus, a practical phase difference compensating element can be obtained.

EXAMPLE 2

A phase difference compensating element was manufactured in the same manner as in Example 1, except that the Rd-AR film was designed so that the phase difference Rd (25) in obliquely-incident light passing through the phase difference compensating element was approximately −16 nm in the Green band.

FIG. 25 is a table showing the thicknesses of the respective films in the Rd-AR film of Example 2. The result of measurement of Rd (25) in the phase difference compensating element including this Rd-AR film was −16 nm at a wavelength of 540 nm. The phase difference compensating element including this Rd-AR film was used in a projection-type image projecting device. The contrast obtained as a result was several times higher than that with a phase difference compensating element not providing a predetermined phase difference to the antireflection film.

EXAMPLE 3

A phase difference compensating element was manufactured in the same manner as in Example 1, except that the Rd-AR film was designed so that the phase difference Rd (25) in obliquely-incident light passing through the phase difference compensating element was approximately −16 nm in the Red band.

FIG. 26 is a table showing the thicknesses of the respective films in the Rd-AR film of Example 3. The result of measurement of Rd (25) in the phase difference compensating element including this Rd-AR film was −16 nm at a wavelength of 632 nm. The phase difference compensating element including this Rd-AR film was used in a projection-type image projecting device. The contrast obtained as a result was several times higher than that with a phase difference compensating element not providing a predetermined phase difference to the antireflection film.

EXAMPLE 4

A phase difference compensating element was manufactured in the same manner as in Example 1, except that the Rd-AR film was designed so that the phase difference Rd (25) in obliquely-incident light passing through the phase difference compensating element was approximately −16 nm in a visible light band (450 to 650 nm).

FIG. 27 is a table showing the thicknesses of the respective films in the Rd-AR film of Example 4. The result of measurement of Rd (25) in the phase difference compensating element including this Rd-AR film was −16 nm at a wavelength of 540 nm. The phase difference compensating element including this Rd-AR film was used in a projection-type image projecting device. The contrast obtained as a result was several times higher than that with a phase difference compensating element not providing a predetermined phase difference to the antireflection film. However, the wavelength dispersion of Rd (25) was large.

COMPARATIVE EXAMPLE 1

The Rd-AR film was designed so that the phase difference Rd (25) in obliquely-incident light passing through the phase difference compensating element was approximately −16 nm in the Blue band. In this case, the Rd-AR film was formed with a smaller number of layers than that in Example 1. Other than that, a phase difference compensating element was manufactured in the same manner as in Example 1.

FIG. 28 is a table showing the thicknesses of the respective films in the Rd-AR film of Comparative Example 1. The result of measurement of Rd (25) in the phase difference compensating element including this Rd-AR film was −16 nm at a wavelength of 460 nm. Also, Rd(25, 435)/Rd(25, 495) was 1.57. Here, Rd(25, 435) is the phase difference to be provided in 25-degree obliquely-incident light at λ=435 nm, and Rd(25, 495) is the phase difference to be provided in 25-degree obliquely-incident light at λ=495 nm. The phase difference compensating element including this Rd-AR film was used in a projection-type image projecting device. The contrast obtained as a result was 20% lower than that in the phase difference compensating element of Example 1 in which Rd(25, 435)/Rd(25, 495) is 1.26.

As described above, a phase difference compensating element according to this embodiment can control the in-plane phase difference (R0) with an obliquely-deposited film, and the phase difference (Rd) in obliquely-incident light with a dielectric multi-layer film, independently of each other. Accordingly, phase difference controllability can be dramatically improved. Also, as the dielectric multi-layer film is provided with a phase difference and an antireflection function, the manufacturing process can be greatly simplified.

Further, where a phase difference compensating element according to this embodiment is used in a projection-type image projecting device, luminance, contrast, and viewing angle properties can be improved.

It should be understood that the present invention is not limited to those examples, and various changes and modifications may be made to them without departing from the scope of the invention. In Examples, the thicknesses of all the obliquely-deposited films in the birefringent layer are the same, and therefore, the birefringent axis is the z-axis direction. However, the axial direction can be arbitrarily tilted by alternately changing the thicknesses, for example.

Although phase difference compensating elements have been described in Examples, the present technology can also be used in a quarter-wave plate or a half-wave plate that requires phase difference control for obliquely-incident light, for example.

GLOSSARY OF DRAWING REFERENCES

10 . . . substrate, 11 . . . Rd-AR film, 21 . . . optical film, 22 . . . medium, 31 . . . transparent substrate, 32 . . . Rd-AR film, 33 . . . birefringent layer, 34 . . . CVD dielectric film, 35 . . . antireflection film, 40 . . . vertically-oriented liquid crystal layer, 41 . . . reflective light modulating element, 42 . . . reflective polarizer, 43 . . . phase difference compensating element, 100 . . . vertically-oriented liquid crystal layer, 110 . . . reflective light modulating element, 120 . . . reflective polarizer.

The invention claimed is:

1. A phase difference compensating element comprising:
a birefringent layer formed with a film stack of a plurality of obliquely-deposited films, each of the obliquely-deposited films having a thickness equal to or smaller than a used wavelength; and
a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein the phase-difference-adding antireflection layer provides the opposite phase difference to the phase difference in obliquely-incident transmitted light in the birefringent layer.

2. The phase difference compensating element according to claim 1, wherein the birefringent layer is formed by stacking a deposition material alternately from two directions symmetrical about a normal direction of a substrate, and a thickness of each one of the obliquely-deposited films is not smaller than 5 nm and not greater than 100 nm.

3. The phase difference compensating element according to claim 1, wherein the obliquely-deposited films are of at least one kind selected from among $Ta_2O_5$, $TiO_2$, $SiO_2$, $Al_2O_3$, $CeO_2$, $ZrO_2$, $ZrO$, and $Nb_2O_5$.

4. The phase difference compensating element according to claim 1, wherein a stress adjustment layer formed with a dielectric film is formed on a transparent substrate, and the birefringent layer is formed on a side of the stress adjustment layer.

5. A phase difference compensating element comprising:
a birefringent layer formed with a film stack of a plurality of obliquely-deposited films, each of the obliquely-deposited films having a thickness equal to or smaller than a used wavelength; and
a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein a film thickness of each of the dielectric films of the phase-difference-adding antireflection layer is not smaller than $\lambda/100$ and not greater than $\lambda/2$ ($\lambda$ being an arbitrary wavelength in a used wavelength band), and the number of the dielectric films is not smaller than eight and not larger than 1000.

6. The phase difference compensating element according to claim 5, wherein all the dielectric films of the phase-difference-adding antireflection layer have different thicknesses from one another.

7. A phase difference compensating element comprising:
a birefringent layer formed with a film stack of a plurality of obliquely-deposited films, each of the obliquely-deposited films having a thickness equal to or smaller than a used wavelength; and
a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein a relationship between a dielectric material having the highest refractive index NH in relative terms and a dielectric material having the lowest refractive index NL in relative terms in the phase-difference-adding antireflection layer satisfies $0.4 < (NH - NL) < 1.5$.

8. A phase difference compensating element comprising:
a birefringent layer formed with a film stack of a plurality of obliquely-deposited films, each of the obliquely-deposited films having a thickness equal to or smaller than a used wavelength; and a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein the phase-difference-adding antireflection layer satisfies tL/(tH+tL)>0.4, where tH represents a thickness of a dielectric material having the highest refractive index in relative terms, and tL represents a thickness of a dielectric material having the lowest refractive index in relative terms.

9. A phase difference compensating element comprising:
a birefringent layer formed with a film stack of a plurality of obliquely-deposited films, each of the obliquely-deposited films having a thickness equal to or smaller than a used wavelength; and
a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein a phase difference Rd to be provided by the phase-difference-adding antireflection layer satisfies $1<Rd(\lambda)/Rd(\lambda')<1.5 (\lambda<\lambda')$, at an arbitrary wavelength $\lambda$ in a used wavelength band and within an incident light angle range of 0 to 25 degrees.

10. A phase difference compensating element comprising:
a birefringent layer formed with a film stack of a plurality of obliquely-deposited films, each of the obliquely-deposited films having a thickness equal to or smaller than a used wavelength; and
a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein the dielectric films are of at least one kind selected from among $Ta_2O_5$, $TiO_2$, $SiO_2$, $Al_2O_3$, $CeO_2$, $ZrO_2$, $ZrO$, and $Nb_2O_5$.

11. A phase difference compensating element comprising:
a birefringent layer formed with a film stack of a plurality of obliquely-deposited films, each of the obliquely-deposited films having a thickness equal to or smaller than a used wavelength; and
a phase-difference-adding antireflection layer configured to provide an arbitrary phase difference, in addition to a phase difference in obliquely-incident transmitted light in the birefringent layer, the phase-difference-adding antireflection layer being formed with a film stack of two or more kinds of dielectric films having different refractive indexes, wherein, in the birefringent layer, a phase difference caused by incident light has angle dependence substantially symmetrical about a normal direction of a base material surface having the birefringent layer formed thereon, and an incident light direction serving as the center of the angle dependence of the phase difference of the birefringent layer is substantially equal to a normal direction of a base material surface having the phase-difference-adding antireflection layer formed thereon.

12. A projection-type image projecting device comprising a phase difference compensating element provided between a reflective polarizer and a reflective light modulating element,
the phase difference compensating element including: a birefringent layer formed with a film stack of a plurality of obliquely-deposited films, each of the obliquely-deposited films having a thickness equal to or smaller than a used wavelength; and a phase-difference-adding antireflection layer configured to provide the opposite phase difference to a phase difference in obliquely-incident transmitted light in the birefringent layer, the phase- difference-adding antireflection layer being formed with a film stack of two or more kinds of dielectric films having different refractive indexes, wherein a phase difference Rd to be provided by the phase-difference-adding antireflection layer satisfies $1<Rd(\lambda)/Rd(\lambda')<1.5 (\lambda<\lambda')$, at an arbitrary wavelength $\lambda$ in a used wavelength band and within an incident light angle range of 0 to 25 degrees.

* * * * *